(12) United States Patent
Kim et al.

(10) Patent No.: US 12,283,213 B2
(45) Date of Patent: Apr. 22, 2025

(54) METHOD FOR EXPANDING DISPLAY OF ELECTRONIC DEVICE, AND ELECTRONIC DEVICE FOR SUPPORTING SAME

(71) Applicant: Samsung Electronics Co., Ltd., Suwon-si (KR)

(72) Inventors: Juyeoung Kim, Suwon-si (KR); Minsoo Kim, Suwon-si (KR); Sanghyuk Koh, Suwon-si (KR); Seonkeun Park, Suwon-si (KR); Sunghoon Lee, Suwon-si (KR); Jaewoong Chung, Suwon-si (KR); Hanchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/618,106

(22) Filed: Mar. 27, 2024

(65) Prior Publication Data
US 2024/0242648 A1 Jul. 18, 2024

Related U.S. Application Data

(63) Continuation of application No. PCT/KR2022/015400, filed on Oct. 12, 2022.

(30) Foreign Application Priority Data

Oct. 12, 2021 (KR) .................. 10-2021-0134916
Feb. 15, 2022 (KR) .................. 10-2022-0019331

(51) Int. Cl.
G09G 3/00 (2006.01)
G06F 3/04886 (2022.01)

(52) U.S. Cl.
CPC .......... *G09G 3/035* (2020.08); *G06F 3/04886* (2013.01); *G09G 2340/12* (2013.01); *G09G 2354/00* (2013.01)

(58) Field of Classification Search
CPC ........ G06F 21/32; G06F 3/016; G06F 3/0412; G06F 3/0416; G06F 3/04817;
(Continued)

(56) References Cited

U.S. PATENT DOCUMENTS

2016/0246330 A1 8/2016 Kim et al.
2016/0306534 A1 10/2016 Woo et al.
(Continued)

FOREIGN PATENT DOCUMENTS

EP 3 531 230 A2 8/2019
KR 10-2016-00123620 A 10/2016
(Continued)

OTHER PUBLICATIONS

International Search Report dated Jan. 16, 2023 issued in International Patent Application No. PCT /KR2022/015400.
(Continued)

*Primary Examiner* — Nelson M Rosario
(74) *Attorney, Agent, or Firm* — Jefferson IP Law, LLP

(57) ABSTRACT

An electronic device is provided and includes a display, memory, and one or more processors communicatively coupled to the display and the memory, wherein the one or more computer programs cause the electronic device to display a first screen in a first area of the display during a first state, detect an event in a state display a first object corresponding to the event in a partial area of the first area, identify a first gesture input of a user in an area, and change a state of the display from the first state to a second state in which the first area and the second area of the display are exposed to the outside of the electronic device.

19 Claims, 20 Drawing Sheets

(58) Field of Classification Search
CPC ....... G06F 3/04883; G06F 2203/04105; G06F 2203/04106; G06F 1/1652; G06F 3/04847; G06F 2203/04102; H04M 1/7243; H04M 1/72448; H04M 1/72469; G09F 9/301; G09G 3/035; G09G 5/373; G09G 2320/08; G09G 2340/04; G09G 2340/0407; G09G 2340/0442; G09G 2340/0464; G09G 2380/02; G09G 3/20; G09G 5/38
See application file for complete search history.

(56) References Cited

U.S. PATENT DOCUMENTS

| | | | |
|---|---|---|---|
| 2018/0136835 A1 | 5/2018 | Heo et al. | |
| 2018/0284892 A1* | 10/2018 | Kwon | G06F 3/0416 |
| 2019/0155492 A1* | 5/2019 | Woo | G06F 3/04847 |
| 2019/0261519 A1 | 8/2019 | Park et al. | |
| 2021/0034210 A1 | 2/2021 | Chung et al. | |
| 2021/0072796 A1 | 3/2021 | Kim et al. | |
| 2021/0157366 A1 | 5/2021 | Shim et al. | |
| 2021/0166651 A1 | 6/2021 | Shim et al. | |
| 2022/0113842 A1 | 4/2022 | Kim et al. | |
| 2022/0121244 A1 | 4/2022 | Kwon | |
| 2022/0148464 A1 | 5/2022 | Kwak et al. | |
| 2023/0029563 A1 | 2/2023 | Choi et al. | |
| 2023/0188639 A1* | 6/2023 | Kim | H04M 1/0237 455/566 |

FOREIGN PATENT DOCUMENTS

| | | |
|---|---|---|
| KR | 10-2016-0139287 A | 12/2016 |
| KR | 10-2019-0098340 A | 8/2019 |
| KR | 10-2247663 B1 | 5/2021 |
| KR | 10-2256042 B1 | 5/2021 |
| KR | 10-2256292 B1 | 5/2021 |
| KR | 10-2256681 B1 | 5/2021 |
| KR | 10-2021-0074254 A | 6/2021 |
| KR | 10-2262962 B1 | 6/2021 |
| WO | 2021-045275 A1 | 3/2021 |
| WO | 2021-085658 A1 | 5/2021 |
| WO | 2021-160276 A1 | 8/2021 |
| WO | 2021-160278 A1 | 8/2021 |

OTHER PUBLICATIONS

Extended European Search Report dated Nov. 26, 2024, issued in European Patent Application No. 22881347.3.

* cited by examiner

METHOD FOR EXPANDING DISPLAY OF ELECTRONIC DEVICE, AND ELECTRONIC DEVICE FOR SUPPORTING SAME

CROSS-REFERENCE TO RELATED APPLICATION(S)

This application is a continuation application, claiming priority under § 365(c), of an International application No. PCT/KR2022/015400, filed on Oct. 12, 2022, which is based on and claims the benefit of a Korean patent application number 10-2021-0134916, filed on Oct. 12, 2021, in the Korean Intellectual Property Office, and of a Korean patent application number 10-2022-0019331, filed on Feb. 15, 2022, in the Korean Intellectual Property Office, the disclosure of each of which is incorporated by reference herein in its entirety.

BACKGROUND

1. Field

The disclosure relates to a method for expanding a display of an electronic device, and an electronic device for supporting the same.

2. Description of Related Art

When using an electronic device, such as a smartphone or a tablet personal computer (PC), there are requirements of simultaneously operating several applications. However, the size of a screen of a mobile terminal is smaller than that of a monitor of a computer, and thus there is restriction occurring when several applications are simultaneously displayed on a screen.

To address the issue in the size of the screen of the mobile terminal, the use of an electronic device including a flexible display has increased. The flexible display may include a slidable display, a foldable display, or a rollable display, and for convenience of use of the electronic device, various forms of flexible displays are developed.

As a method of simultaneously operating several applications in a mobile terminal, a split-window function or a pop-up window function may be provided. The split-window function is a scheme of splitting a display of a mobile terminal according to a predetermined layout and displaying an execution screen of each application in each area. The pop-up window function is a scheme of displaying an execution screen of a second application on an execution screen of a first application and displaying a pop-up window on which the execution screen of the second application by moving the pop-up window as necessary.

The above information is presented as background information only to assist with an understanding of the disclosure. No determination has been made, and no assertion is made, as to whether any of the above might be applicable as prior art with regard to the disclosure.

SUMMARY

In an electronic device, when an object (for example, a virtual keyboard) is additionally displayed on a screen displayed on a display, an area in which the screen is display is reduced by an area in which the object is overlapped and displayed. Alternatively, in an electronic device, in a case where a split-window function is applied, the size of an execution screen of each application is reduced compared to a case where an execution screen of a single application is displayed. Alternatively, when a pop-up window function is applied, an execution screen of a second application is displayed as a pop-up window on an execution screen of a first application, and thus at least a part of the execution screen of the first application is hidden by the execution screen of the second application.

In an electronic device, when an object (for example, a virtual keyboard) is be overlapped and displayed on a screen, a split-window function is to be applied, a pop-up window function is applied, or a screen of the electronic device needs to be expanded or reduced, a method of expanding or reducing a flexible display of the electronic device is required.

There is a problem in a scheme of expanding a flexible display by using a physical button included in an electronic device in that a space for disposing and mounting a separate button is required.

Aspects of the disclosure are to address at least the above-mentioned problems and/or disadvantages and to provide at least the advantages described below. Accordingly, an aspect of the disclosure is to provide a method for expanding the display of an electronic device, and an electronic device for supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a display, memory storing one or more computer programs, and one or more processors communicatively coupled to the display and the memory, wherein the one or more computer programs include computer-executable instructions that, when executed by the one or more processors, cause the electronic device to control the display to display a first screen in a first area of the display during a first state in which a second area among the first area and the second area of the display is not exposed to an outside of the electronic device, detect an event in a state in which the first screen is displayed in the first area, control, based on detection of the event, the display to display a first object corresponding to the event in a partial area of the first area, the first object being displayed in at least a part of the first screen, identify a first gesture input of a user in an area in which the first object is displayed, in a state in which an area ratio of a size of the first object to a size of the first area is equal to or greater than a designated ratio, and control, in response to the identification of the first gesture input, the electronic device to change a state of the display from the first state to a second state in which the first area and the second area of the display are exposed to the outside of the electronic device.

In accordance with another aspect of the disclosure, an operation method of an electronic device is provided. The operation method includes displaying a first screen in a first area of a display during a first state in which a second area among the first area and the second area of the display of the electronic device is not exposed to an outside of the electronic device, detecting an event in a state in which the first screen is displayed in the first area, displaying, based on detection of the event, a first object corresponding to the event in a partial area of the first area, the first object being displayed in at least a part of the first screen, identify a first gesture input of a user in an area in which the first object is displayed, in a state in which an area ratio of a size of the first object to a size of the first area is equal to or greater than a designated ratio, and in response to the identification of the first gesture input, change a state of the display from the first state to a second state in which the first area and the second area of the display are exposed to the outside of the electronic device.

In accordance with another aspect of the disclosure, one or more non-transitory computer-readable storage media storing computer-executable instructions that, when executed by one or more processors of an electronic device, cause the electronic device to perform operations are provided. The operations include displaying a first screen in a first area of a display during a first state in which a second area among the first area and the second area of the display of the electronic device is not exposed to an outside of the electronic device, detecting an event in a state in which the first screen is displayed in the first area, displaying, based on detection of the event, a first object corresponding to the event in a partial area of the first area, the first object being displayed in at least a part of the first screen, identifying a first gesture input of a user in an area in which the first object is displayed, in a state in which an area ratio of a size of the first object to a size of the first area is equal to or greater than a designated ratio, and in response to the identification of the first gesture input, changing a state of the display from the first state to a second state in which the first area and the second area of the display are exposed to the outside of the electronic device In accordance with another aspect of the disclosure, a method of expanding a display of an electronic device and the electronic device for supporting the same are provided, whereby in use of an electronic device including an expandable display, a method of naturally expanding a screen, based on usability of the electronic device can be provided.

According to various embodiments of the disclosure, a method of expanding a screen of an electronic device while the electronic device is held by both ends is provided, whereby risk of dropping the electronic device during screen expansion of the electronic device can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
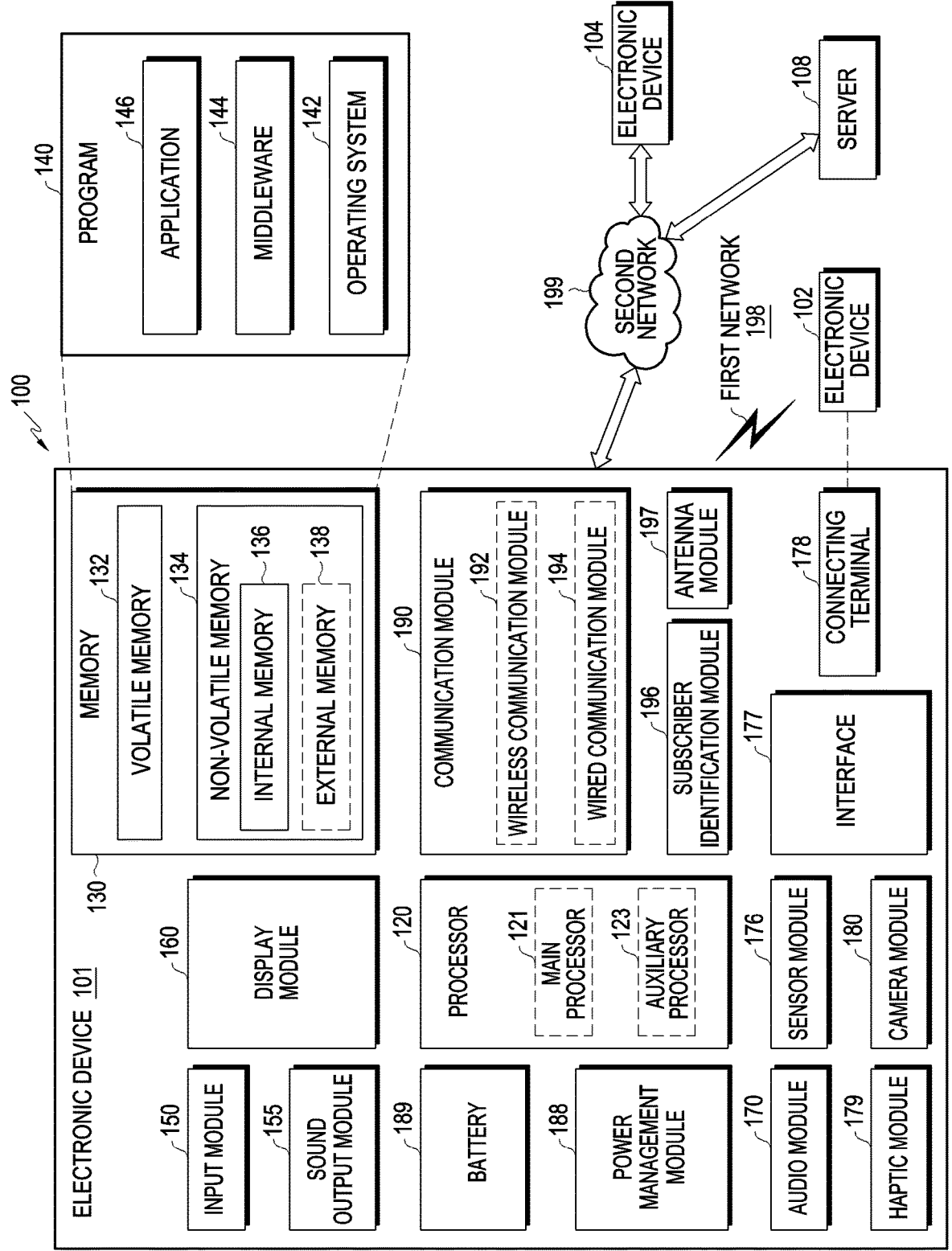
FIG. 1 is a block diagram illustrating an electronic in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (wi-fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element includes a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
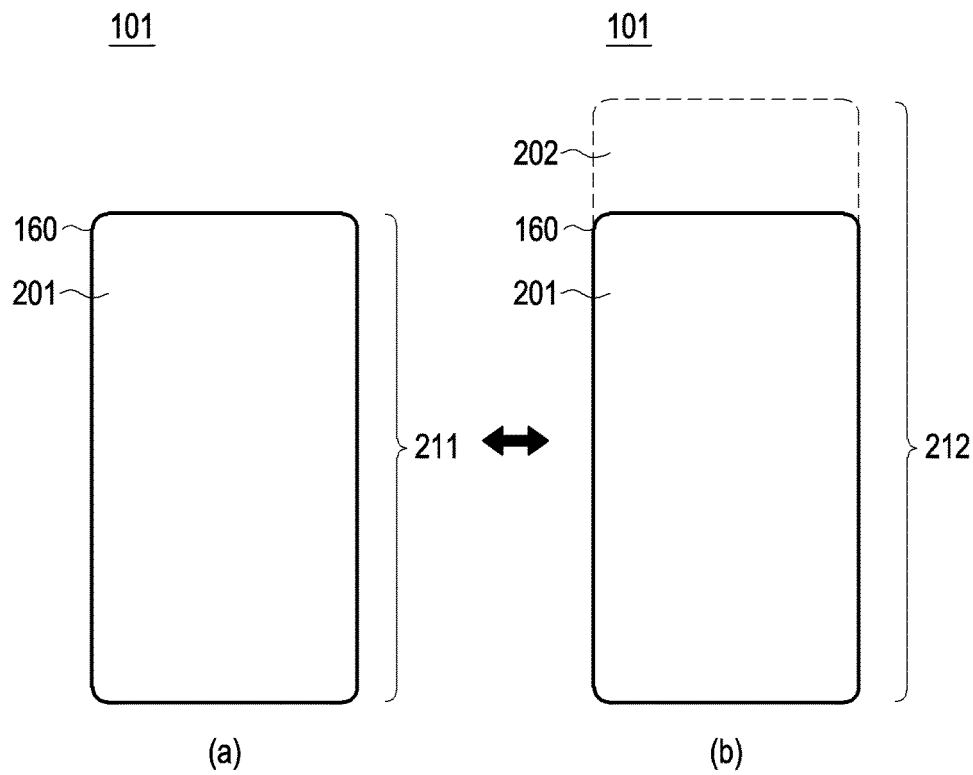
FIG. 2 illustrates an operation of an electronic device according to an embodiment of the disclosure.

FIG. 2 illustrates an operation of an electronic device according to an embodiment of the disclosure.

Figure 3:
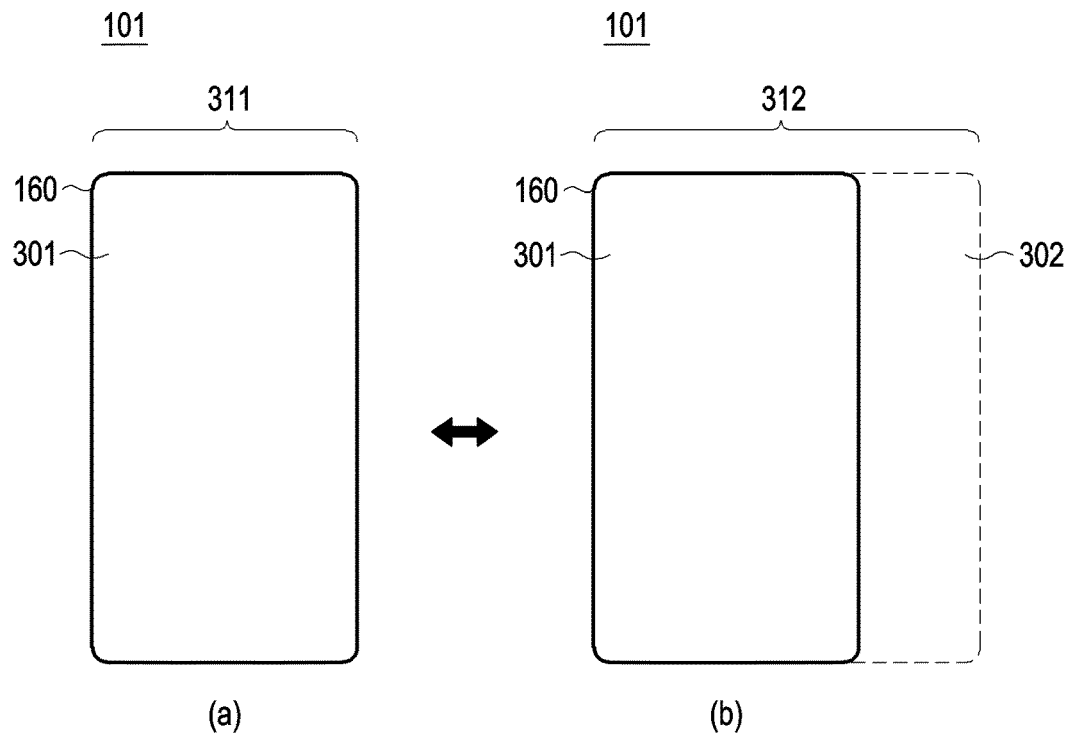
FIG. 3 illustrates an operation of an electronic device according to an embodiment of the disclosure.

FIG. 3 illustrates an operation of an electronic device according to an embodiment of the disclosure.

FIG. 2 illustrates an operation of an electronic device 101 having a display model 160 expandable in a vertical direction according to an embodiment of the disclosure.

FIG. 3 illustrates an operation of an electronic device 101 having a display module 160 expandable in a horizontal direction according to an embodiment of the disclosure.

Referring to FIG. 2, an electronic device 101 according to various embodiments may be expanded in a first direction (for example, a lengthwise direction or a vertical direction of the electronic device 101). For example, a display module 160 of the electronic device 101 may be expanded in the first direction (for example, the lengthwise direction or the vertical direction of the electronic device 101). For example, part (a) of FIG. 2 illustrates a state 211 in which the electronic device 101 (for example, the display module 160) is reduced, and part (b) of FIG. 2 illustrates a state 212 in which the electronic device 101 (for example, the display module 160) is expanded. For example, referring to FIG. 2, the display module 160 of the electronic device 101 may include a first area 201 and a second area 202. For example, referring to part (a) of FIG. 2, in the state 211 in which the electronic device 101 (for example, the display module 160) is reduced, a first area 201 of the display module 160 may be exposed to the outside of the electronic device 101. For example, referring to part (a) of FIG. 2, in the state 211 in which the electronic device 101 (for example, the display module 160) is reduced, a second area 202 of the display module 160 may not be exposed to the outside of the electronic device 101. For example, referring to part (b) of FIG. 2, in the state 212 in which the electronic device 101 (for example, the display module 160) is expanded, the first area 201 and the second area 202 of the display module 160 may be exposed to the outside of the electronic device 101. For example, referring to FIG. 2, the electronic device 101 (for example, the display module 160) may be expanded from the reduced state 211 to the expanded state 212, and may be reduced from the expanded state 212 to the reduced state 211. For example, the electronic device 101 (for example, the processor 120 of the electronic device 101) may control at least one element of the electronic device 101 to expand or reduce the electronic device 101 (for example, the display module 160). There is no limitation to the scheme of expanding or reducing the electronic device 101 (for example, the display module 160). For example, the electronic device 101 may include a flexible display module 160. For example, as the electronic device 101 is expanded or reduced, the flexible display module 160 may be deformed, or the area of the flexible display module 160, which is exposed to the outside of the electronic device 101, may be expanded or reduced. For example, the flexible display module 160 may be a slidable display module, a rollable display module, or a foldable display module, and there is no limitation to the type of the display module 160. FIG. 2 illustrates that as the electronic device 101 (for example, the display module 160) is expanded, the second area 202 is moved and exposed to the outside while the first area 201 of the display module 160 is fixed, but it is illustrative, and according to another embodiment of the disclosure, as the electronic device 101 (for example, the display module 160) is expanded, the first area 201 of the display module 160 may be moved and another area (not shown) of the display module 160 may be moved and exposed to the outside. According to another embodiment of the disclosure, as the electronic device 101 (for example, the display module 160) is expanded, the first area 201 of the display module 160 is moved, whereby another area (not shown) of the display module 160 may be exposed to the outside while being fixed. When a partial area (for example, the first area 201, the second area 202, or another area (not shown)) of the display module 160 is moved, it may mean that the location is changed or the form is changed according to a sliding, rolling, or folding operation upon the implantation of the display module 160, and there is no limitation thereto.

Referring to FIG. 3, an electronic device 101 according to various embodiments may be expanded in a second direction (for example, a widthwise direction or a horizontal direction of the electronic device 101). For example, a display module 160 of the electronic device 101 may be expanded in the second direction (for example, the widthwise direction or the horizontal direction of the electronic device 101). For example, part (a) of FIG. 3 illustrates a state 311 in which the electronic device 101 (for example, the display module 160) is reduced, and part (b) of FIG. 3 illustrates a state 312 in which the electronic device 101 (for example, the display module 160) is expanded. For example, referring to FIG. 3, the display module 160 of the electronic device 101 may include a first area 301 and a second area 302. For example, referring to part (a) of FIG. 3, in the state 311 in which the electronic device 101 (for example, the display module 160) is reduced, the first area 301 of the display module 160 may be exposed to the outside of the electronic device 101. For example, referring to part (a) of FIG. 3, in the state 311 in which the electronic device 101 (for example, the display module 160) is reduced, a second area 302 of the display module 160 may not be exposed to the outside of the electronic device 101. For example, referring to part (b) of FIG. 3, in the state 312 in which the electronic device 101 (for example, the display module 160) is expanded, the first area 301 and the second area 302 of the display module 160 may be exposed to the outside of the electronic device 101. For example, referring to FIG. 3, the electronic device 101 (for example, the display module 160) may be expanded from the reduced state 311 to the expanded state 312, and may be reduced from the expanded state 312 to the reduced state 311. For example, the electronic device 101 (for example, the processor 120 of the electronic device 101) may control at least one element of the electronic device 101 to expand or reduce the electronic device 101 (for example, the display module 160). There is no limitation to the scheme of expanding or reducing the electronic device 101 (for example, the display module 160). For example, the electronic device 101 may include a flexible display module 160. For example, as the electronic device 101 is expanded or reduced, the flexible display module 160 may be deformed, or the area of the flexible display module 160, which is exposed to the outside of the electronic device 101, may be expanded or reduced. For example, the flexible display module 160 may be a slidable display module, a rollable display module, or a foldable display module, and there is no limitation to the type of the display module 160. FIG. 3 illustrates that as the electronic device 101 (for example, the display module 160) is expanded, the second area 302 is moved and exposed to the outside while the first area 301 of the display module 160 is fixed, but it is illustrative, and according to another embodiment of the disclosure, as the electronic device 101 (for example, the display module 160) is expanded, the first area 301 of the display module 160 may be moved and another area (not shown) of the display module 160 may be moved and exposed to the outside. According to another embodiment of the disclosure, as the electronic device 101 (for example, the display module 160) is expanded, the first area 301 of the display module 160 is moved, whereby another area (not shown) of the display module 160 may be exposed to the outside while being fixed. When a partial area (for example, the first area 201, the second area 202, or another area (not shown)) of the display module 160 is moved, it may mean that the location is changed or the form is changed according to a sliding, rolling, or folding operation upon the implantation of the display module 160, and there is no limitation thereto.

Figure 4:
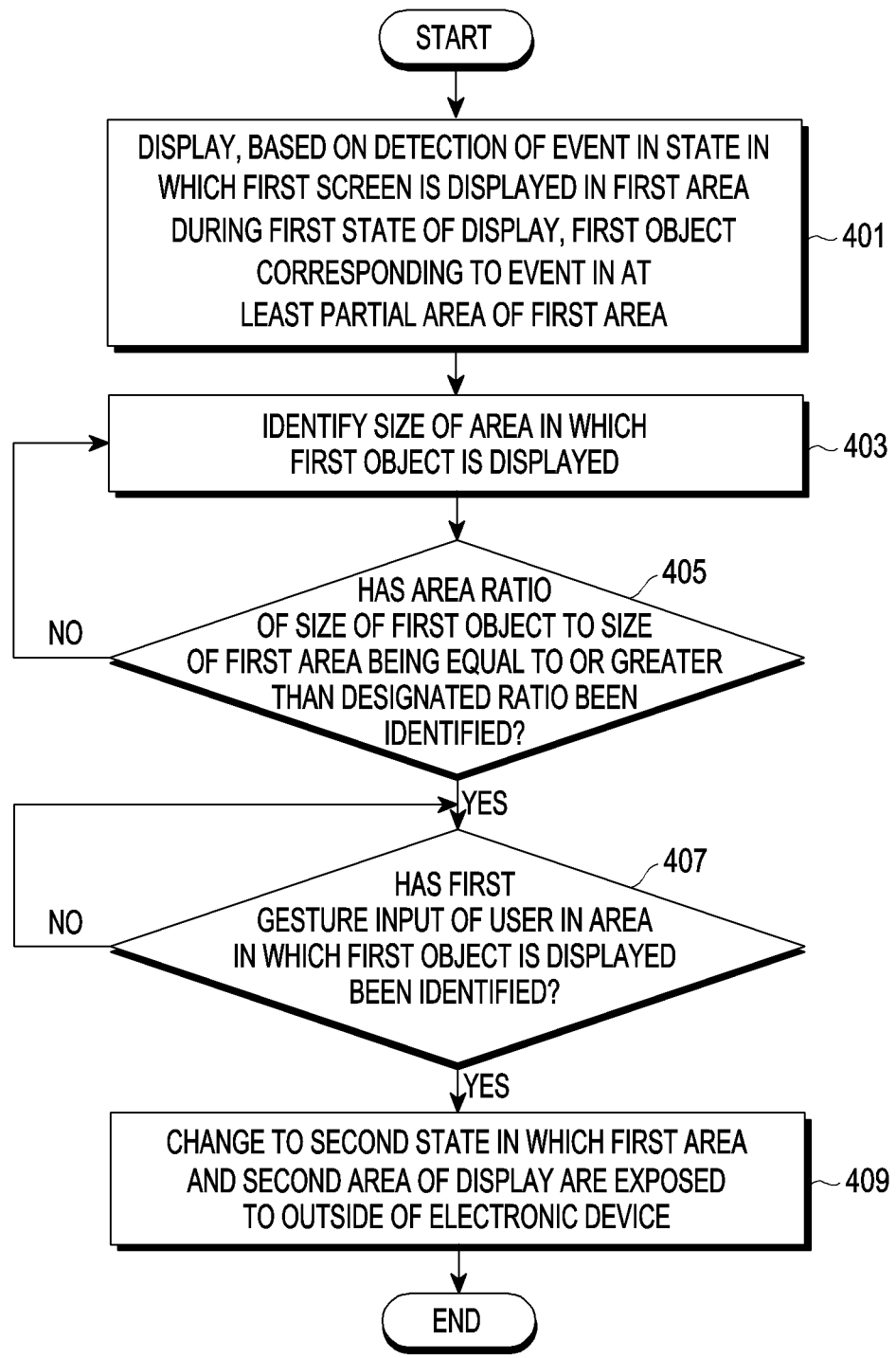
FIG. 4 is a flowchart illustrating an operation of an electronic device according to an embodiment of the disclosure.

FIG. 4 is a flowchart illustrating an operation of an electronic device according to an embodiment of the disclosure.

The description will be made with reference to FIGS. 4, 5, and 6.

Figure 5:
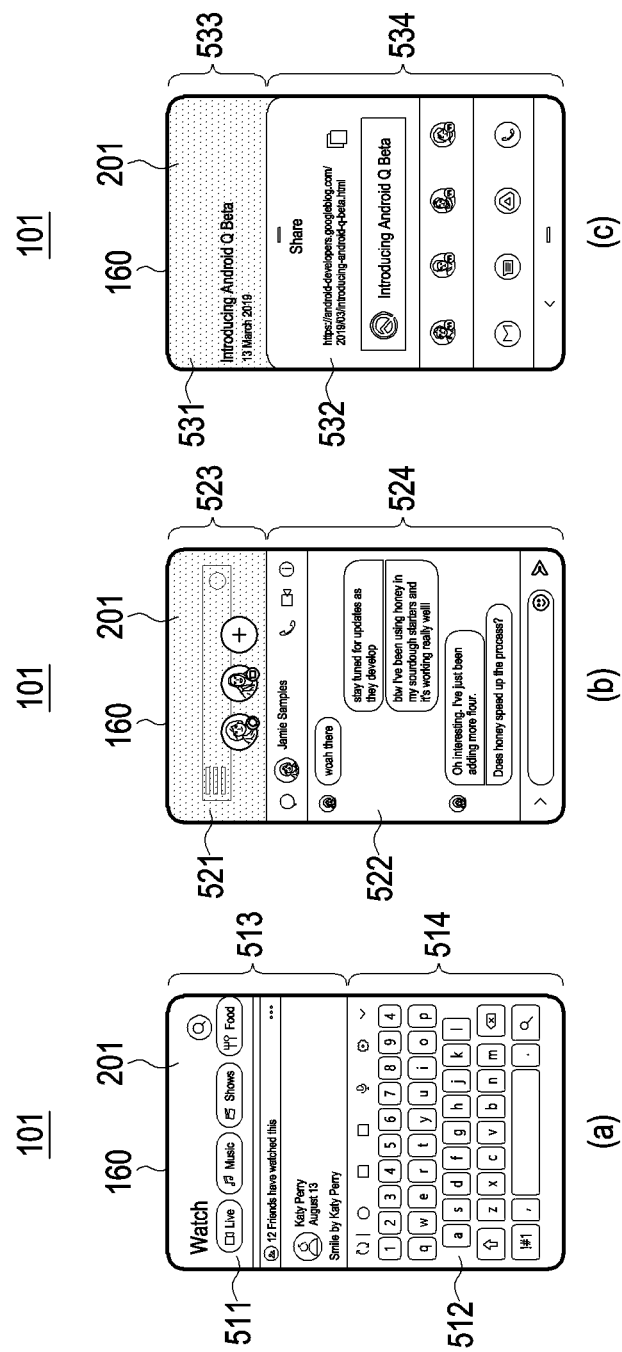
FIG. 5 illustrates an operation of an electronic device according to an embodiment of the disclosure.

FIG. 5 illustrates an operation of an electronic device according to an embodiment of the disclosure.

Figure 6:
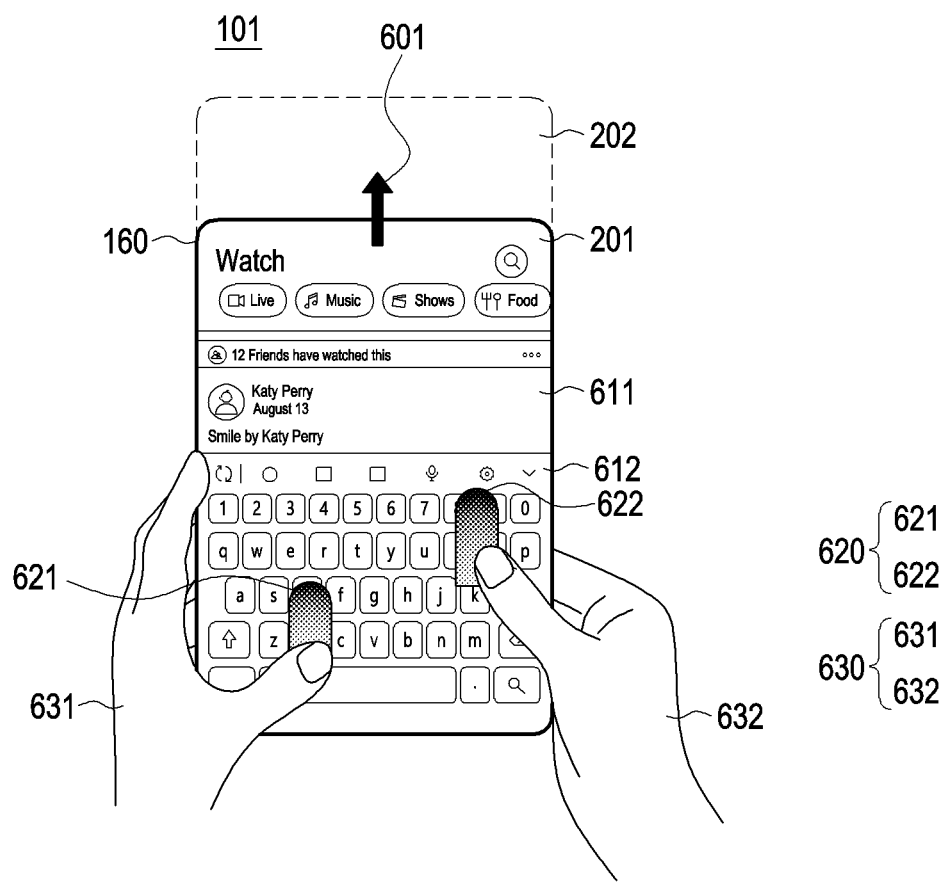
FIG. 6 illustrates an operation of an electronic device according to an embodiment of the disclosure.

FIG. 6 illustrates an operation of an electronic device according to an embodiment of the disclosure.

Referring to FIG. 4, in operation 401, an electronic device 101 (for example, the processor 120 of the electronic device 101) according to various embodiments may display, based on detection of an event (for example, an event calling a virtual keyboard, a chat bubble window, or a share menu) in a state in which a screen (for example, a first screen 511 of part (a), a second screen 521 of part (b), or a third screen 531 of part (c) of FIG. 5) is displayed in a first area (for example, a first area 201 of FIG. 5) of a display module 160 while the display module 160 is in a first state (for example, a reduced state), an object (for example, a first object 512 of part (a), a second object 522 of part (b), or a third object 532 of part (c) of FIG. 5) corresponding to the detected event in at least a partial area of the first area (for example, the first area 201 of FIG. 5).

Referring to part (a) of FIG. 5, the electronic device 101 may display, based on detection of an event (for example, an event calling a virtual keyboard) in a state in which the first screen 511 is displayed in at least a part of the first area 201 (for example, an entire area of the first area 201) while the display module 160 is in a reduced state, the first object 512 (for example, a virtual keyboard) corresponding to the detected event in at least a partial area of the first area 201. For example, the virtual keyboard may be an object in the form of a keyboard displayed on an execution screen of an application requiring a keyboard input. For example, the electronic device 101 may display, based on detection of an event (for example, an event calling a virtual keyboard) in a state in which the first screen 511 is displayed in a first part 513 and a second part 514 of the first area 201 while the electronic device is in a reduced state, the first object 512 (for example, a virtual keyboard) corresponding to the detected event in the second part 514 of the first area 201 while continuously display the first screen 511 having been displayed in the first part 513 of the first area 201. It may be described that in part (a) of FIG. 5, the first object 512 is displayed while being overlapped onto at least a part of the first screen 511. There is no limitation to a screen display scheme of the electronic device 101, for example, the electronic device 101 may overlay a first layer and a second layer onto each other and display the same, the first layer including the first screen 511 and the second layer including the first object 512, and the scheme of overlaying layers and displaying the same is described in FIGS. 7, 8, 9, and 10 below.

Referring to part (b) of FIG. 5, the electronic device 101 may display, based on detection of an event (for example, an event calling a chat bubble window) in a state in which the second screen 521 is displayed in at least a part (for example, an entire area of the first area 201) of the first area 201 while the display module 160 is in a reduced state, the second object 522 (for example, a chat bubble window) corresponding to the detected evented in at least a partial area of the first area 201. For example, the chat bubble window may be an execution screen of a chatting application provided in a pop-up window scheme. For example, the electronic device 101 may display, based on detection of an event (for example, an event calling a chat bubble window) in a state in which the second screen 521 is displayed in a third part 523 and a fourth part 524 of the first area 201 while the electronic device is in a reduced state, the second object 522 (for example, a chat bubble window) corresponding to the detected event in the fourth part 524 of the first area 201 while continuously displaying the second screen 521 having been displayed in the third part 523 of the first area 201. It may be described that in part (b) of FIG. 5, the second object 522 is displayed while being overlapped onto at least a part of the second screen 521.

Referring to part (c) of FIG. 5, the electronic device 101 may display, based on an event (for example, an event calling a share menu) in a state in which the third screen 531 is displayed in at least a part of the first area 201 (for example, an entire area of the first area 201) while the display module 160 is in a reduced state, the third object 532 (for example, a share menu) corresponding to the detected event in at least a partial area of the first area 201. For example, the share menu may be an object used to transfer a content including a file, a link, or text to a cloud server, another electronic device, or another application. For example, the electronic device 101 may display, based on detection of an event (for example, an event calling a share menu) in a state in which the third screen 531 is displayed in a fifth part 533 and a sixth part 534 of the first area 201 while the electronic device 101 is in a reduced state, the third object 532 (for example, a share menu) corresponding to the detected event in the sixth part 534 of the first area 201 while continuously displaying the third screen 531 having been displayed in the fifth part 533 of the first area 201. It may be described that the third object 532 is displayed while being overlapped onto at least a part of the third screen 531 in part (c) of FIG. 5.

The forms of objects illustrated in FIG. 5 are illustrative, and thus there is no limitation to the form of an object. A method of expanding a display (for example, the display module 160) of the electronic device 101 are applicable in a case where execution screens of multiple applications are simultaneously displayed on a screen, a case where an execution screen of another application is overlapped, or a case where an object which can be displayed together with an execution screen of another application is operated.

In operation 403, the electronic device 101 according to various embodiments may identify the size of an area in which the object (for example, the first object 512 of part (a), the second object 522 of part (b), or the third object 532 of part (c) of FIG. 5) corresponding to the detected event (for example, the event calling a virtual keyboard, a chat bubble window, or a share menu) is displayed.

For example, referring to part (a) of FIG. 5, the electronic device 101 may identify the size (for example, the height or the area) of the area (for example, the second part 514 of the first area 201) in which the first object 512 is displayed. For example, the electronic device 101 may identify an area ratio of the area (for example, the second part 514 of the first area 201) of the first object 512 to the area of the first area 201 of the display module 160.

Referring to part (b) of FIG. 5, the electronic device 101 may identify the size (for example, the height or the area) of the area (for example, the fourth part 524 of the first area 201) in which the second object 522 is displayed. For example, the electronic device 101 may identify an area ratio of the area (for example, the fourth part 524 of the first area 201) of the second object 522 to the area of the first area 201 of the display module 160.

Referring to part (c) of FIG. 5, the electronic device 101 may identify the size (for example, the height or the area) of the area (for example, the sixth part 534 of the first area 201) in which the third object 512 is displayed. For example, the electronic device 101 may identify an area ratio of the area (for example, the sixth part 534 of the first area 201) of the third object 532 to the area of the first area 201 of the display module 160.

In operation 405, the electronic device 101 according to various embodiments may perform operation 407, based on identification that the ratio (for example, the height ratio or the area ratio) of the size (for example, the height or the area) of the area in which the object (for example, the first object 512 of part (a), the second object 522 of part (b), or the third object 532 of part (c) of FIG. 5) corresponding to the detected event (for example, the event calling a virtual keyboard, a chat bubble window, or a share menu) is displayed to the size (for example, the height or the area) of the first area 201 of the display module 160 is equal to or greater than a designated ratio.

In operation 407, the electronic device 101 according to various embodiments may perform operation 409, based on identification of a gesture input (for example, a double touch drag gesture input (for example, 620 of FIG. 6)) of a user (for example, 630 of FIG. 6) in the area in which the object (for example, the first object 512 of part (a), the second object 522 of part (b), or the third object 532 of part (c) of FIG. 5) corresponding to the detected event (for example, the event calling a virtual keyboard, a chat bubble window, or a share menu) is displayed. For example, referring to FIG. 6, the electronic device 101 may identify a gesture input 620 (for example, the double touch drag gesture input) of a user 630 in the area in which a virtual keyboard 612 corresponding to the event (for example, the event calling a virtual keyboard) detected when the electronic device 101 (for example, the display module 160) is in a reduced state is displayed. For example, the electronic device 101 may identify the gesture input 620 (for example, a double touch drag gesture input 621 and 622) input in a designated direction (for example, the direction in which the electronic device 101 (for example, the display module 160) is expanded (for example, direction 601)) starting from a first point and a second point in the area in which the virtual keyboard 612 is displayed. There is no limitation to the type of the gesture input, and various gesture inputs are described in FIG. 11 below. For example, to perform operation 409 in the embodiment of FIG. 6, the double touch drag gesture input 620 is identified, but to perform operation 409 in another embodiment of the disclosure, a single touch drag gesture input (for example, 621 or 622 with a user's left hand 631 or a user's right hand 632) may be identified and another designated gesture input may be identified. For example, when the designated gesture input (for example, 620) is identified in the area in which the virtual keyboard 612 is displayed, the electronic device 101 may perform operation 409, and when the designated gesture input (for example, 620) is identified in an area other than the area in which the virtual keyboard 612 is displayed, the electronic device may not perform operation 409. For example, the electronic device 101 may generate a gesture layer (for example, a layer in which the gesture input (for example, 620) of the user 630 related to expansion or reduction of the electronic device 101 (for example, the display module 160) is detected), thereby controlling the expansion and reduction of the electronic device 101 (for example, the display module 160) according to the gesture input that is input on the gesture layer generated in the area in which the virtual keyboard 612 is displayed, and the gesture layer will be described in FIGS. 7, 8, 9, and 10 below.

In operation 409, the electronic device 101 according to various embodiments may control the electronic device 101 to change the state to a second state (for example, an expanded state) in which a first area (for example, 201 of FIG. 6) and a second area (for example, 202 of FIG. 6) of the display module 160 are exposed to the outside of the electronic device 101. For example, the electronic device 101 may control the electronic device to change the state of the electronic device 101 (for example, the display module 160) from the reduced state to the expanded state according to the user's gesture input (for example, 620 of FIG. 6) identified in operation 407.

Figure 7:
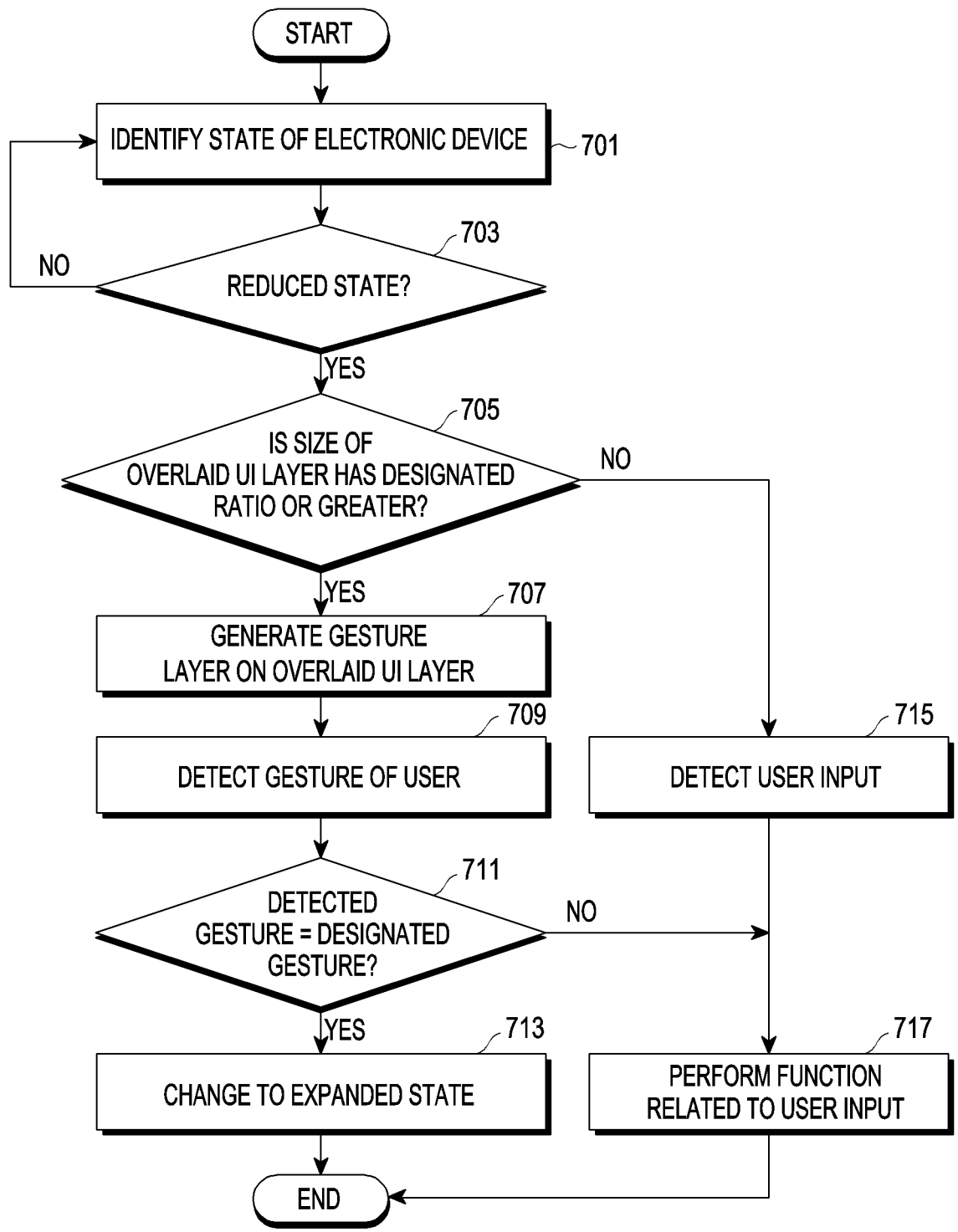
FIG. 7 is a flowchart illustrating an operation of an electronic device according to an embodiment of the disclosure.

FIG. 7 is a flowchart illustrating an operation of an electronic device according to an embodiment of the disclosure.

FIG. 7 is described with reference to FIGS. 8, 9, and 10.

Figure 8:
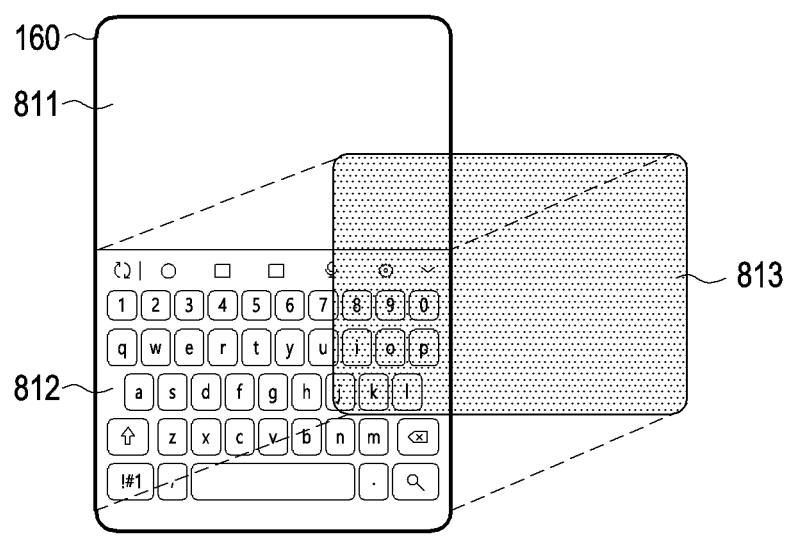
FIG. 8 illustrates an operation of an electronic device according to an embodiment of the disclosure.

FIG. 8 illustrates an operation of an electronic device according to an embodiment of the disclosure.

Figure 9:
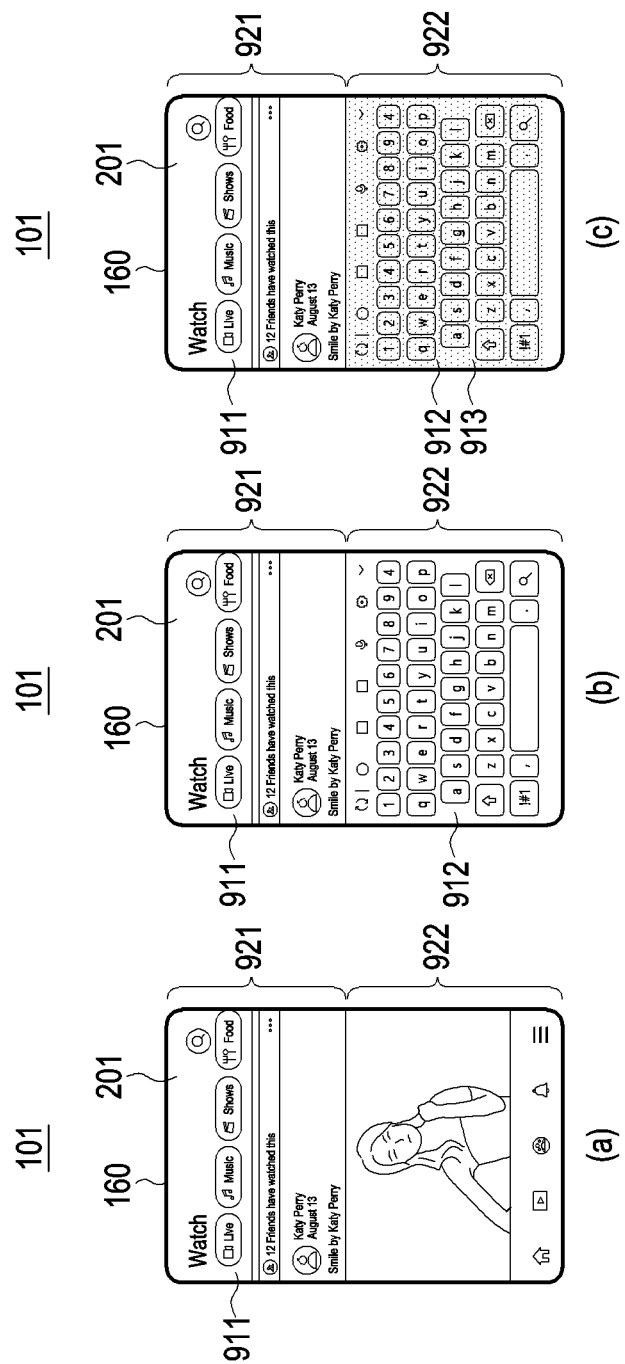
FIG. 9 illustrates an operation of an electronic device according to an embodiment of the disclosure.

FIG. 9 illustrates an operation of an electronic device according to an embodiment of the disclosure.

Figure 10:
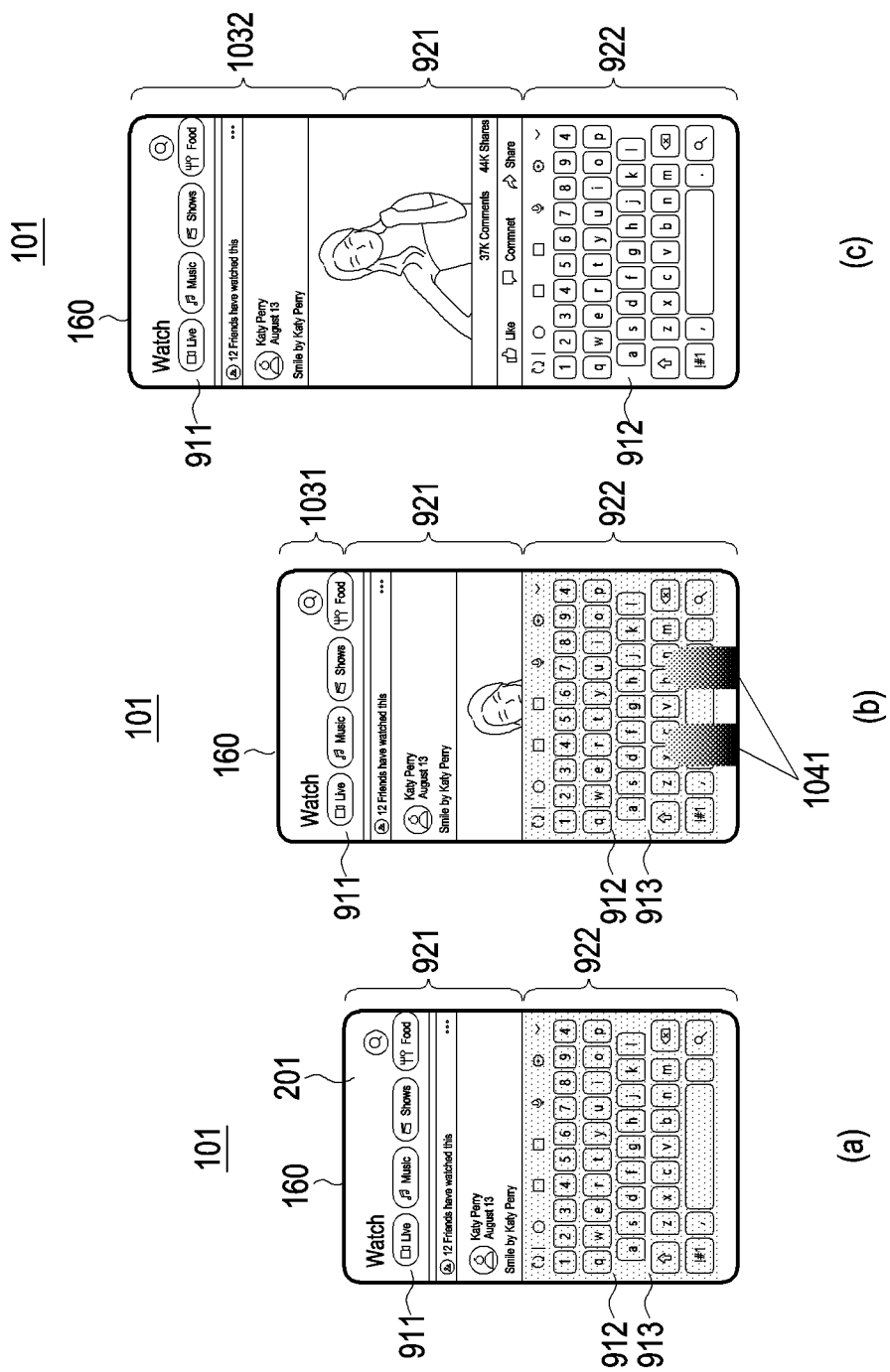
FIG. 10 illustrates an operation of an electronic device according to an embodiment of the disclosure.

FIG. 10 illustrates an operation of an electronic device according to an embodiment of the disclosure.

Referring to FIG. 7, in operation 701, an electronic device 101 (for example, the processor 120 of the electronic device 101) according to various embodiments may identify the state of the electronic device 101. For example, the electronic device 101 may identify whether the electronic device 101 (for example, a display module 160) is in a reduced state (for example, 211 of FIG. 2 or 311 of FIG. 3) or an expanded state (for example, 212 of FIG. 2 or 312 of FIG. 3). For example, the electronic device 101 may identify the state (for example, the reduced state or the expanded state) of the electronic device 101 by using a sensor module 176 (for example, a hall IC). There is not limitation to the scheme of identifying the state of the electronic device 101 by the electronic device 101. In operation 703, the electronic device 101 according to various embodiments may perform operation 705, based on the state of electronic device 101 being the reduced state (for example, 211 of FIG. 2 or 311 of FIG. 3).

In operation 705, the electronic device 101 according to various embodiments may identify whether the size of an overlaid layer (for example, a UI layer) has a designated ratio or greater. For example, according to a result of operation 705, the electronic device may perform operation 707 or operation 715.

For example, overlaying multiple layers may mean, for example, overlapping a second layer onto at least a partial area of a first layer and displaying the same on the display module 160.

Referring to FIG. 8, the electronic device 101 may overlay a second layer 812 including a first object (for example, a virtual keyboard) onto at least a partial area of a first layer 811 including a first screen (for example, an execution screen of an Internet application). For example, at least a part of the first screen included in the first layer 811 may be hidden by the first object included in the second layer 812 and may not be displayed on a screen. For example, the at least a part of the first screen included in the first layer 811 may be hidden by the first object included in the second layer 812, but according to the transparency of the first object (or the second layer 812 including the first object), the at least a part of the first screen and the first object may be overlapped and displayed on the screen.

For example, referring to part (a) of FIG. 9, the electronic device 101 may display a first layer including a first screen 911 (for example, an execution screen of a social networking service (SNS) application) in a first area 201 (for example, a first part 921 and a second part 922 of the first area 201) of the display module 160. For example, referring to part (b) of FIG. 9, the electronic device 101 may overlay, based on detection of an event (for example, an event calling a virtual keyboard), a second layer (for example, a UI layer) including a first object 912 (for example, the virtual keyboard) in at least a partial area (for example, the second part 922 of the first area 201) onto a first layer including the first screen 911 (for example, the execution screen of the social networking service (SNS) application). For example, the electronic device 101 may identify whether the size of the overlaid second layer (for example, the UI layer) has a designated ratio or greater. For example, the electronic device 101 may identify whether the ratio of the size (for example, the height or the area) of the first object 912 (for example, the virtual keyboard) to the size (for example, the height or the area) of the first area 201 is equal to or greater than a designated ratio.

In operation 707, the electronic device 101 according to various embodiments may generate, based on the size of the overlaid layer (for example, the UI layer) having a designated ratio or greater, a layer (for example, a gesture layer) for detecting the user's gesture on the overlaid layer (for example, the UI layer).

According to an embodiment of the disclosure, referring to FIG. 8, the electronic device 101 may generate a third layer 813 (for example, a gesture layer) on the second layer 812 including the first object (for example, the virtual keyboard). For example, the electronic device 101 may generate the transparent third layer 813 (For example, the gesture layer) in the area in which the first object (for example, the virtual keyboard) is displayed so that the electronic device 101 can receive the user's gesture input to an area in which the third layer 813 (for example, the gesture layer) is generated even though the transparent third layer 813 (for example, the gesture layer) is not displayed on a screen of the display module 160. For example, the third layer 813 (for example, the gesture layer) may be a layer for receiving the gesture input related to the expansion or the reduction of the electronic device 101 (for example, the display module 160).

For example, referring to part (c) of FIG. 9, the electronic device 101 may generate, based on the size of the second layer (for example, the UI layer) including the first object 912 (for example, the virtual keyboard) having a designated ratio or greater, the third layer 913 (for example, the gesture layer) for detecting the user's gesture on the overlaid second layer (for example, UI layer) (for example, in the second part 922 of the first area 201 of the display module 160).

In operation 709, the electronic device 101 according to various embodiments may detect the user's gesture. For example, referring to FIG. 10, in part (a) of FIG. 10, the electronic device 101 may generate a third layer 913 (for example, a gesture layer) on a second layer (for example, a UI layer) including the first object 912 (for example, the virtual keyboard), and in part (b) of FIG. 10, may detect, based on the generated third layer 913 (for example, the gesture layer), the user's gesture input 1041 to an area (for example, a second part 922 of the first area 201 of the display module 160) in which the first object 912 (for example, the virtual keyboard) is displayed.

In FIGS. 7, 8, 9, and 10, an embodiment of generating a layer (for example, a gesture layer (for example, 813 of FIG. 8)) for generating the user's designated gesture input (for example, a gesture input designated for expansion of the display module 160), separately from a layer (for example, a UI layer (for example, 812 of FIG. 8)) overlaid onto the screen, and detecting the user's designated gesture input by using the layer (for example, the gesture layer (for example, 813 of FIG. 8)) for detecting the generated user's designated gesture input is described according to an embodiment. According to another embodiment of the disclosure, the overlaid layer (for example, the UI layer (for example, 812 of FIG. 8)) may be a layer including a function of detecting the user's designated gesture input (for example, the gesture input designated for the expansion of the display module 160). For example, the electronic device 101 may omit operation 707. For example, the electronic device 101 may detect, based on the size of the overlaid layer (for example, the UI layer) having a designated ratio or greater in operation 705, the user's designated gesture input (for example, the gesture input designated for expansion of the display module 160) on the overlaid layer (for example, the UI layer) by using the overlaid layer (for example, the UI layer) in operation 709. In this case, the description on the operation of detecting the user's gesture by using the layer (for example, the gesture layer (for example, 813 of FIG. 8)) for detecting the user's designated gesture input (for example, the gesture input designated for expansion of the display module 160) may be understood as detecting, by the electronic device 101, the user's designated gesture (for example, the gesture input designated for expansion of the display module 160) by using the overlaid layer (for example, the UI layer (for example, 812 of FIG. 8)) of performing a function of the gesture layer, without having a separate gesture layer.

In operation 711, the electronic device 101 according to various embodiments may identify whether the gesture input 1041 detected based on the third layer 913 (for example, the gesture layer) is a designated gesture input. For example, according to a result of operation 711, the electronic device may perform operation 713 or operation 717. For example, referring to part (b) of FIG. 10, the electronic device 101 may perform operation 713, based on the gesture input 1041 detected based on the third layer 913 (for example, the gesture layer) being a designated gesture input (for example, a double touch drag input formed in the direction in which the electronic device 101 is expanded). For example, the electronic device 101 may perform control so as to process the gesture input detected in operation 709 by using the overlaid layer (for example, the UI layer), based on the gesture input detected in operation 709 not being a designated gesture input (for example, a gesture input designated for expansion of the display module 160), and a description thereof will be made in operation 717. For example, the electronic device 101 may also perform operation 717 if a touch input is detected in operation 709.

In operation 713, the electronic device 101 according to various embodiments may control the electronic device 101 to change the state of the electronic device 101 (for example, the display module 160) from a reduced state to an expanded state. For example, in parts (b) and (c) of FIG. 10, the electronic device 101 may control, based on the user's gesture input 1041 being a designated gesture input, the electronic device 101 to change the state from a state in which the electronic device 101 (for example, the display module 160) is reduced (for example, a state in which the first part 921 and the second part 922 of the first area 201 are exposed to the outside of the electronic device 101 (for example, part (a) of FIG. 10)) to a state in which the electronic device is expanded (for example, a state in which at least a partial area (for example, 1031) of the second area 1032 of the display module 160 is additionally exposed to the outside (for example, part (b) of FIG. 10), or more extendedly, a state in which the entire area of the second area 1032 of the display module 160 is additionally exposed to the outside (for example, part (c) of FIG. 10)). For example, part (b) of FIG. 10 may be a drawing illustrating the state in which the electronic device 101 is being expanded according to the user's gesture input 1041, and part (c) of FIG. 10 may be a drawing illustrating the state in which the electronic device 101 is completely expanded. For example, referring to parts (b) and (c) of FIG. 10, as the electronic device 101 (for example, the display module 160) is expanded, the first screen 911 displayed on the display module 160 may be expanded, and accordingly, at least a partial area of the first screen 911, having been hidden by the first object 912 (for example, the virtual keyboard) and not been displayed, may be additionally displayed on the display module 160. According to an embodiment of the disclosure, as in part (c) of FIG. 10, according to the user's gesture input 1041, when the electronic device 101 (for example, the display module 160) is completed expanded, a layer (for example, the third layer 913 (for example, the gesture layer)) for identifying the gesture input related to the expansion and the reduction of the display module 160 may be removed. According to another embodiment of the disclosure, although not shown, the electronic device 101 may continuously maintain the layer (for example, the third layer 913 (for example, the gesture layer)) for identifying the gesture input related to the expansion or the reduction of the electronic device 101 (for example, the display module 160), regardless of whether the electronic device 101 (for example, the display module 160) is expanded. FIG. 10 illustrates an embodiment in which the first area 201 of the display module 160 is fixed and the second area 1032 is moved (or changed) and exposed to the outside, but it is illustrative, and as descried above, the first area 201 is moved (or changed) so that another area (not shown) of the display module 160 may be exposed to the outside, or the first area 201 and another area (not shown) of the display module 160 are moved so that another area (not shown) may not be exposed to the outside.

In operation 715, the electronic device 101 according to various embodiments may detect, based on the size of the overlaid layer (for example, the UI layer) having a ratio smaller than a designated ratio, a user input (For example, the user's gesture input or touch input) by using the overlaid layer (for example, the UI layer). For example, in part (b) of FIG. 9, the electronic device may display a first layer including the first screen 911, overlay the first object 912 (for example, the virtual keyboard) onto at least a partial area (for example, the second part 922 of the first area 201) of the first layer, and detect a user input (for example, a touch input or a gesture input) to an area corresponding to the first layer and the second layer.

In operation 717, the electronic device 101 according to various embodiments may perform a function related to the detected user input. For example, the electronic device 101 may perform, based on the user input detected in operation 715 being a touch input to at least one key of the first object 912 (for example, the virtual keyboard), an operation (for example, a text input operation) corresponding to the touch input. There is no limitation to the detected user input and the function corresponding thereto. For example, the electronic device 101 may perform, based on the user input (for example, the touch input or the gesture input) detected in operation 709 not being a designated gesture input (for example, a gesture input designated for expansion of the display module 160), control to process the user input detected in operation 709 by using the overlaid layer (for example, the UI layer). For example, the electronic device 101 may perform, based on the user input (for example, the touch input or the gesture input) detected in operation 709 not being a designated gesture input (for example, a gesture input designated for expansion of the display module 160), a designated function in response to the user input detected in operation 709.

Figure 11:
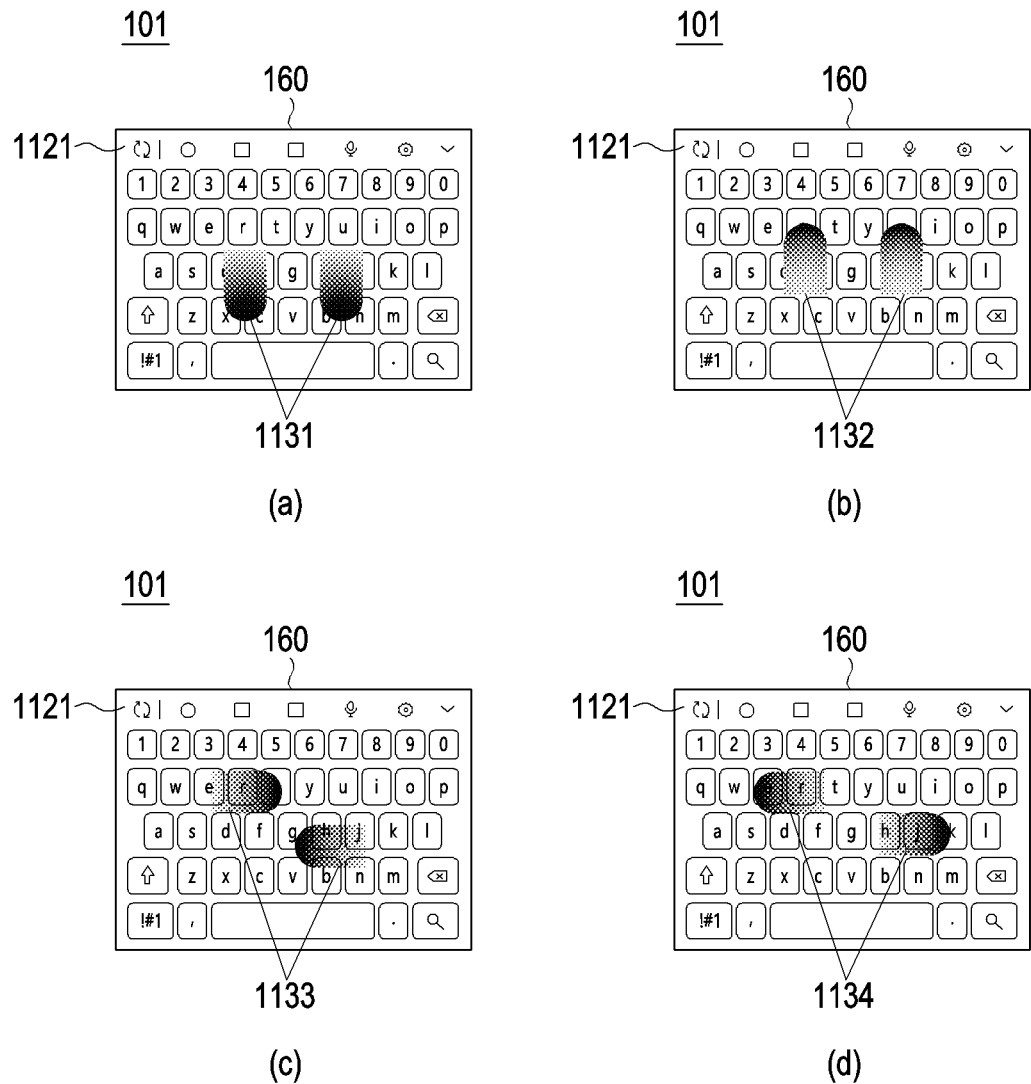
FIG. 11 illustrates an operation of an electronic device according to an embodiment of the disclosure.

FIG. 11 illustrates an operation of an electronic device according to an embodiment of the disclosure.

Referring to FIG. 11, an electronic device 101 (for example, the processor 120 of the electronic device 101) may display, based on detection of an event (for example, an event calling a virtual keyboard, a chat bubble window, or a share menu) in a state in which an execution screen (for example, the first screen 511, the second screen 521, or the third screen 531 of FIG. 5) of a first application is displayed in a first area (for example, the first area 210 of FIG. 2 or the first area 310 of FIG. 3) of the display module 160, an object (for example, the first object 512, the second object 522, or the third object 532 of FIG. 5 or a virtual keyboard 1121 of FIG. 11) corresponding to the detected event (for example, the event calling a virtual keyboard, a chat bubble window, or a share menu) in at least a partial area of the first area (for example, the first area 210 of FIG. 2 or the first area 310 of FIG. 3) of the display module 160. The embodiment of FIG. 11 may be applied to various embodiments of the disclosure, and for convenience of description, the virtual keyboard 1121 is described as an example.

Referring to part (a) of FIG. 11, the electronic device 101 may control, based on detection of a first gesture input 1131 (for example, double touch drag down) in an area in which the virtual keyboard 1121 is displayed, the electronic device 101 to change the state of the electronic device 101 (for example, the display module 160) from an expanded state (for example, the expanded state 212 of part (b) of FIG. 2 or the expanded state 312 of part (b) of FIG. 3) to a reduced state (for example, the reduced state 211 of part (b) of FIG. 2 or the reduced state 311 of part (a) of FIG. 3). For example, as shown in FIG. 2, when the electronic device 101 is a device which can be expanded or reduced in a first direction (for example, the lengthwise direction or the vertical direction of the electronic device 101), the electronic device 101 may control, based on detection of the first gesture input 1131 (for example, double touch drag down) formed in the first direction (for example, the lengthwise direction or the vertical direction of the electronic device 101) in the area in which the virtual keyboard 1121 is displayed, the electronic device 101 to change the state of the electronic device 101 (for example, the display module 160) from an expanded state (for example, the expanded state 212 of part (b) of FIG. 2) to a reduced state (for example, the reduced state 211 of part (b) of FIG. 2). For example, as shown in FIG. 3, when the electronic device 101 is a device which can be expanded or reduced in a second direction (for example, the widthwise direction or the horizontal direction of the electronic device 101), the electronic device 101 may control, based on detection of the first gesture input 1131 (for example, double touch drag down) formed in the first direction (for example, the lengthwise direction or the vertical direction of the electronic device 101), which is perpendicular to the second direction (for example, the widthwise direction or the horizontal direction of the electronic device 101), in the area in which the virtual keyboard 1121 is displayed, the electronic device 101 to change the state of the electronic device 101 (for example, the display module 160) from an expanded state (for example, the expanded state 312 of part (b) of FIG. 3) to a reduced state (for example, the reduced state 311 of part (b) of FIG. 3).

Referring to part (b) of FIG. 11, the electronic device 101 may control, based on detection of the second gesture 1132 (for example, double touch drag down) in the area in which the virtual keyboard 1121 is displayed, the electronic device 101 to change the state of the electronic device 101 (for example, the display module 160) to a reduced state (for example, the reduced state 211 of part (a) of FIG. 2 or the reduced state 311 of part (a) of FIG. 3) to an expanded state (for example, the expanded state 212 of part (b) of FIG. 2 or the expanded state 312 of part (b) of FIG. 3). For example, as shown in FIG. 2, when the electronic device 101 is a device which can be expanded or reduced in a first direction (for example, the lengthwise direction or the vertical direction of the electronic device 101), the electronic device 101 may control, based on detection of the second gesture input 1132 (for example, double touch drag up) formed in the first direction (for example, the lengthwise direction or the vertical direction of the electronic device 101) in the area in which the virtual keyboard 1121 is displayed, the electronic device 101 to change the state of the electronic device 101 (for example, the display module 160) from a reduced state (for example, the reduced state 211 of part (a) of FIG. 2) to an expanded state (for example, the expanded state 212 of part (b) of FIG. 2). For example, as shown in FIG. 3, when the electronic device 101 is a device which can be expanded or reduced in a second direction (for example, the widthwise direction or the horizontal direction of the electronic device 101), the electronic device 101 may control, based on detection of the second gesture input 1132 (for example, double touch drag up) formed in the first direction (for example, the lengthwise direction or the vertical direction of the electronic device 101), which is perpendicular to the second direction (for example, the widthwise direction or the horizontal direction of the electronic device 101), in the area in which the virtual keyboard 1121 is displayed, the electronic device 101 to change the state of the electronic device 101 (for example, the display module 160) from a reduced state (for example, the reduced state 311 of part (a) of FIG. 3) to an expanded state (for example, the expanded state 312 of part (b) of FIG. 3).

Referring to part (c) of FIG. 11, the electronic device 101 may control, based on detection of a third gesture input 1133 (for example, pinch-in) in the area in which the virtual keyboard 1121 is displayed, the electronic device 101 to change the state of the electronic device 101 (for example, the display module 160) from an expanded state (for example, the expanded state 212 of part (b) of FIG. 2 or the expanded state 312 of part (b) of FIG. 3) to a reduced state (for example, the reduced state 211 of part (a) of FIG. 2 or the recued state 311 of part (a) of FIG. 3).

For example, referring to part (d) of FIG. 11, the electronic device 101 may control, based on detection of a fourth gesture input 1134 (for example, pinch-out) in the area in which the virtual keyboard 1121 is displayed, the electronic device 101 to change the state of the electronic device 101 (for example, the display module 160) from a reduced state (for example, the reduced state 211 of part (a) of FIG. 2 or the reduced state 311 of part (a) of FIG. 3) to an expanded state (for example, the expanded state 212 of part (b) of FIG. 2 or the expanded state 312 of part (b) of FIG. 3).

The above-described gesture input (for example, the first gesture input 1131, the second gesture input 1132, the third gesture input 1133, or the fourth gesture input 1134) of FIG. 11 is illustrative, and there is no limitation to the type of the gesture input. For example, the electronic device 101 may control, based on detection of a gesture input (for example, a long press, a three-finger swipe, or a force touch) in the area in which the virtual keyboard 1121 is displayed, the expansion or the reduction of the electronic device 101 (for example, the display module 160).

According to an embodiment of the disclosure, for the scheme of detecting the gesture input in the area in which the virtual keyboard 1121 of FIG. 11 is displayed, FIG. 4 or FIG. 7 may be referred to.

Figure 12:
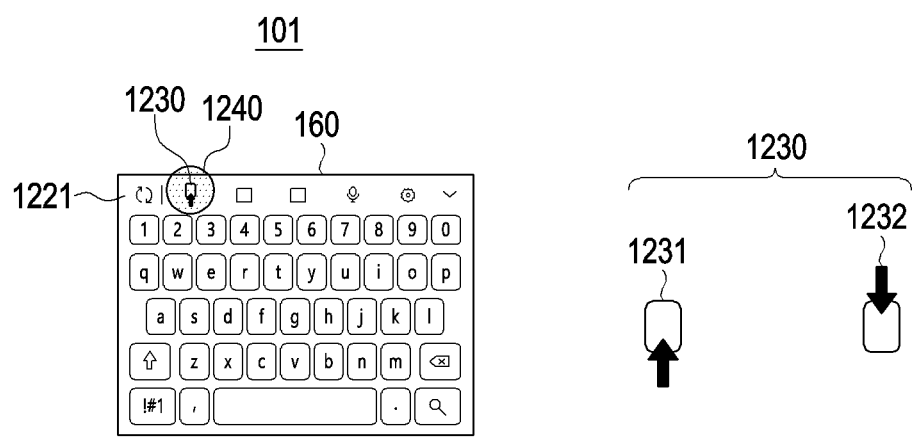
FIG. 12 illustrates an operation of an electronic device according to an embodiment of the disclosure.

FIG. 12 illustrates an operation of an electronic device according to an embodiment of the disclosure.

Referring to FIG. 12, an electronic device 101 (for example, the processor 120 of the electronic device 101) may display, based on detection of an event (for example, an event calling a virtual keyboard, a chat bubble window, or a share menu) in a state in which an execution screen (for example, the first screen 511, the second screen 521, or the third screen 531 of FIG. 5) of a first application is displayed in a first area (for example, the first area 210 of FIG. 2 or the first area 310 of FIG. 3) of the display module 160, an object (for example, the first object 512, the second object 522, or the third object 532 of FIG. 5 or a virtual keyboard 1221 of FIG. 12) corresponding to the detected event (for example, the event calling a virtual keyboard, a chat bubble window, or a share menu) in at least a partial area of a first area (for example, the first area 210 of FIG. 2 or the first area 310 of FIG. 3) of the display module 160. The embodiment of FIG. 12 may be applied to various embodiments of the disclosure, and for convenience of description, the virtual keyboard 1221 is described as an example, Referring to FIG. 12, the electronic device 101 may include an object 1230 (for example, a software button) for expansion or reduction of the electronic device 101 (for example, the display module 160) in the virtual keyboard 1221 displayed in at least a partial area of the display module 160, based on detection of an event (for example, an event calling a virtual keyboard, a chat bubble window, or a share menu). For example, the object 1230 (for example, the software button) for expansion or reduction of the electronic device 101 (for example, the display module 160) may include an expansion button 1231 or a reduction button 1232. For example, the electronic device 101 may control, based on detection of a touch input 1240 to the expansion button 1231 or the reduction button 1232 included in the virtual keyboard 1221 displayed in at least a partial area of the display module 160, expansion or reduction of the electronic device 101 (for example, the display module 160).

Figure 13:
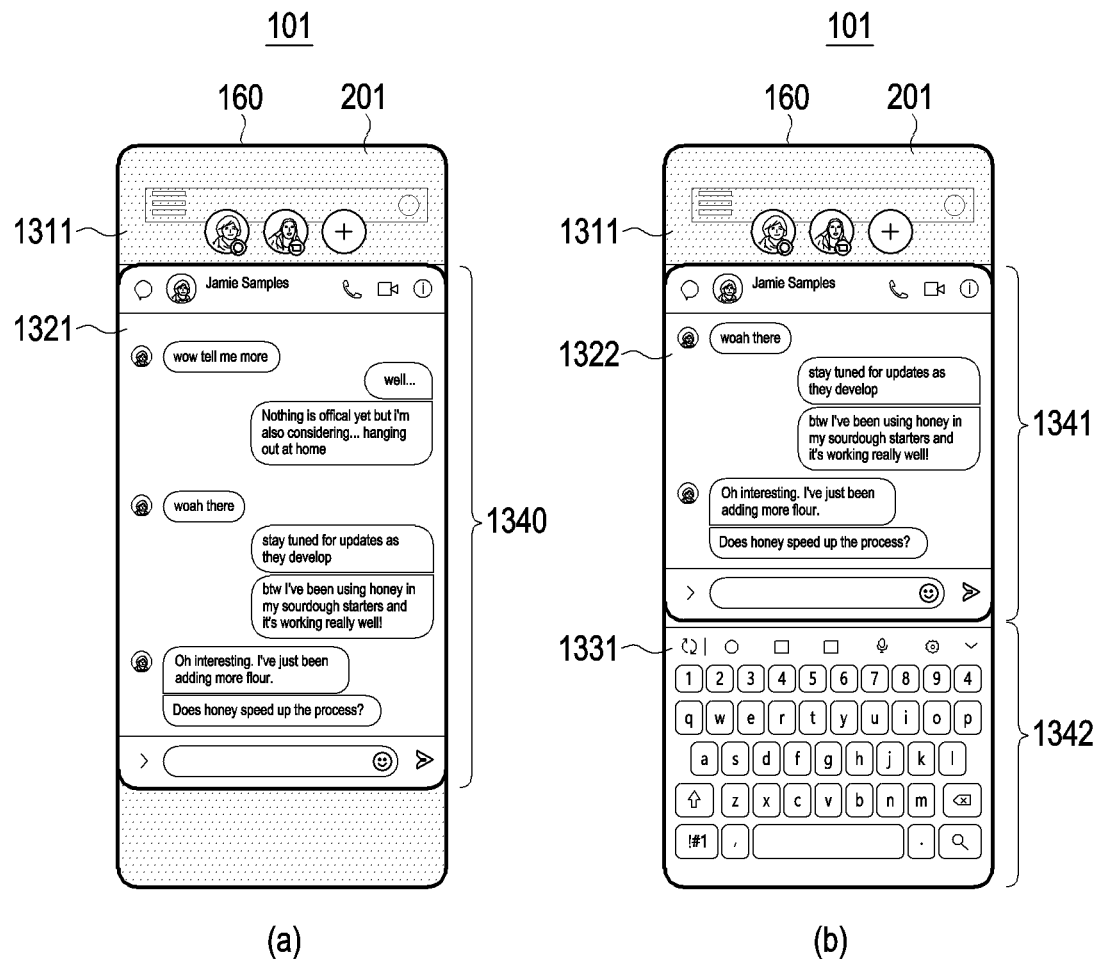
FIG. 13 illustrates an operation of an electronic device according to an embodiment of the disclosure.

FIG. 13 illustrates an operation of an electronic device according to an embodiment of the disclosure.

Referring to part (a) of FIG. 13, an electronic device 101 (for example, the processor 120 of the electronic device 101) may display, based on detection of a first event (for example, an event calling a chat bubble window) in a state in which a first screen 1311 is displayed in the first area 210 of the display module 160, a first object 1321 (for example, a chat bubble window) corresponding to the first event in at least a partial area 1340 of the first area 201. For example, as the scheme of displaying the first object 1321 in the at least a partial area of the first screen 1311, the above-described scheme of overlaying multiple layers may be used, but it is illustrative, and there is no limitation to the scheme of displaying the first object 1321 in the at least a partial area of the first screen 1311.

Referring to part (a) of FIG. 13, the electronic device 101 may control, based on a gesture input (for example, double touch drag) detected in an area corresponding to the first object 1321 (for example, a chat bubble window) displayed in the first area 1311, expansion or reduction of the electronic device 101 (for example, the display module 160). For example, the electronic device 101 may control, based on the ratio (for example, the height ratio or the area ratio) of the size of the first object 1321 (for example, the chat bubble window) to the size of the first area 201 of the display module 160, expansion or reduction of the electronic device 101 (for example, the display module 160), as in the embodiment of FIG. 4 or FIG. 7. For example, the electronic device 101 may generate a gesture layer in an area corresponding to the first object 1321 (for example, the chat bubble window), and control, based on detection of a designated gesture input detected based on the gesture layer, expansion or reduction of the electronic device 101 (for example, the display module 160).

Referring to FIG. 13, the electronic device 101 may display a first object 1322 (for example, the chat bubble window) in a first part 1341 of the first area 201 and display a second object 1331 (for example, the virtual keyboard) in a second part 1342 of the first area 201 as shown in part (b) of FIG. 13, based on detection of a second event (for example, an event calling a virtual keyboard) in the state in which the first object 1321 (for example, the chat bubble window) is displayed on the first screen 1311 as shown in part (b) of FIG. 13.

Referring to part (b) of FIG. 13, the electronic device 101 may control, based on a gesture input (for example, double touch drag) detected in an area corresponding to the first object 1321 (for example, the chat bubble window) and the second object 1331 (for example, the virtual keyboard) displayed on the first screen 1311, expansion or reduction of the electronic device 101 (for example, the display module 160). For example, in part (b) of FIG. 13, the electronic device 101 may control, based on the ratio (for example, the height ratio or the area ratio) of a sum of the size of the first object 1321 (for example, the chat bubble window) and the size of the second object 1331 (for example, the virtual keyboard) to the size of the first area 201 of the display module 160, expansion or reduction of the electronic device 101 (for example, the display module 160) as in the embodiment of FIG. 4 or FIG. 7. For example, the electronic device 101 may generate a gesture layer in an area corresponding to the first object 1321 (for example, the chat bubble window) or the second object 1331 (for example, the virtual keyboard), and control, based on a designated gesture input detected based on the gesture layer, expansion or reduction of the electronic device 101 (for example, the display module 160).

Figure 14A:
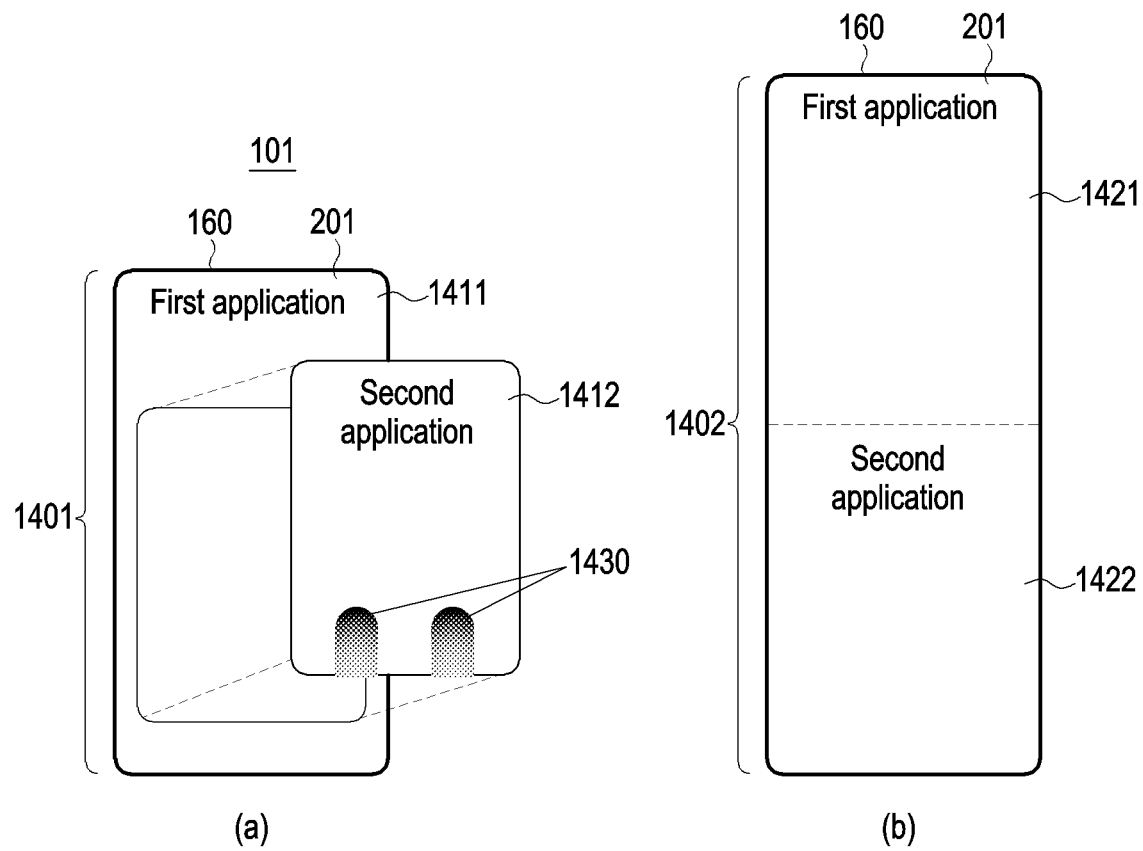
FIG. 14A illustrates an operation of an electronic device according to an embodiment of the disclosure.

FIG. 14A illustrates an operation of an electronic device according to an embodiment of the disclosure.

Referring to FIG. 14A, an electronic device 101 (for example, the processor 120 of the electronic device 101) may display a first execution screen 1411 of a first application in the first area 201 of the display module 160 in a state 1401 in which the electronic device 101 (for example, the display module 160) is reduced. For example, the electronic device 101 may display a second execution screen 1412 of a second application in at least a partial area on the first execution screen 1411 in the form of a pop-up window. For example, the electronic device 101 may control, based on detection of a gesture input 1430 (for example, double touch drag) in an area corresponding to the second execution screen 1412 displayed in the form of a pop-up window, the electronic device 101 (for example, the display module 160) to be expanded. For example, the electronic device 101 may display, based on the gesture input 1430, a third execution screen 1421 and a fourth execution screen 1422 in a split window scheme by changing the state of the electronic device 101 (for example, the display module 160) to an expanded state 1402, displaying the third execution screen 1421 of the first application in the first part of the display module 160, and displaying the fourth execution screen 1422 of the second application in the second part of the display module 160.

Figure 14B:
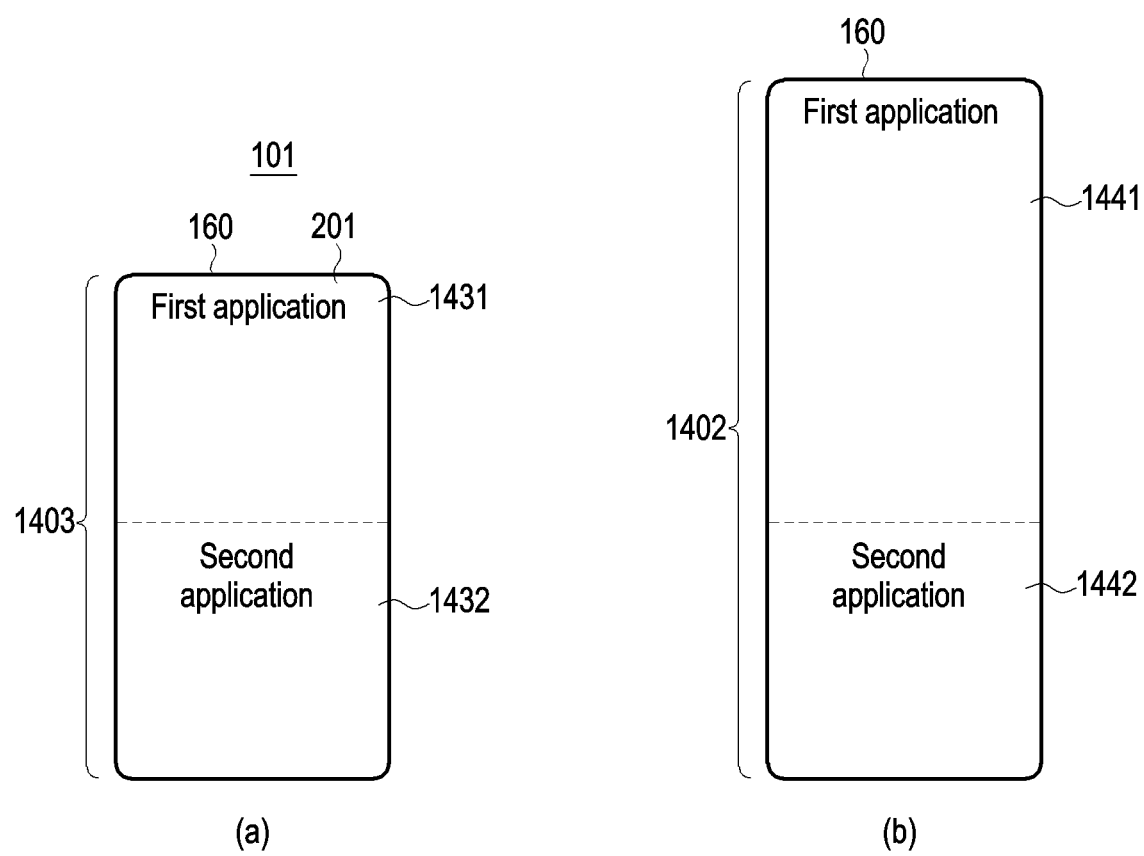
FIG. 14B illustrates an operation of an electronic device according to an embodiment of the disclosure.

FIG. 14B illustrates an operation of an electronic device according to an embodiment of the disclosure.

Referring to FIG. 14B, an electronic device 101 (for example, the processor 120 of the electronic device 101) may display a first execution screen 1431 of a first application in a first part of the first area 201 of the display module 160 and display a second execution screen 1432 of a second application in a second part of the first area 201 of the display module 160 while the electronic device 101 (for example, the display module 160) is in a reduced state 1403. For example, the electronic device 11 may display the first execution screen 1411 and the second execution screen 1412 in the form of a split window. For example, the electronic device 101 may control, based on detection of a designated gesture (for example, double touch drag) in an area corresponding to the second execution screen 1432, the electronic device 101 (for example, the display module 160) to be expanded. For example, the electronic device 101 may detect, based on a gesture layer (for example, a layer for detecting a designated gesture input) generated in the area in which the second execution screen 1432 is displayed, a designated gesture input (for example, double touch drag) in an area corresponding to the second execution screen 1432. In another example, the electronic device 101 may also detect, based on a layer including a function of detecting a designated gesture input as a layer including the second execution screen 1432, the designated gesture input (for example, double touch drag) in the area corresponding to the second execution screen 1432. For example, the electronic device 101 may change the state of the electronic device 101 (for example, the display module 160) to an expanded state 1404, display a third execution screen 1441 of a first application in a third part of the display module 160, and display a fourth execution screen 1442 of a second application in a fourth part of the display module 160, based on the designated gesture input. For example, the fourth execution screen 1442 of the second application may be the same screen as the second execution screen 1432 of the second application, the fourth execution screen being displayed in the same location as that of the second execution screen. For example, the electronic device 101 may continuously display, based on the designated gesture input, the execution screen (for example, the second execution screen 1432) of the second application in the location in which the execution screen has been displayed, and the execution screen of the first application may be displayed in the area including the expanded area of the display module 160 as the state of the electronic device 101 (for example, the display module 160) is changed to the expanded state 1404.

Figure 15:
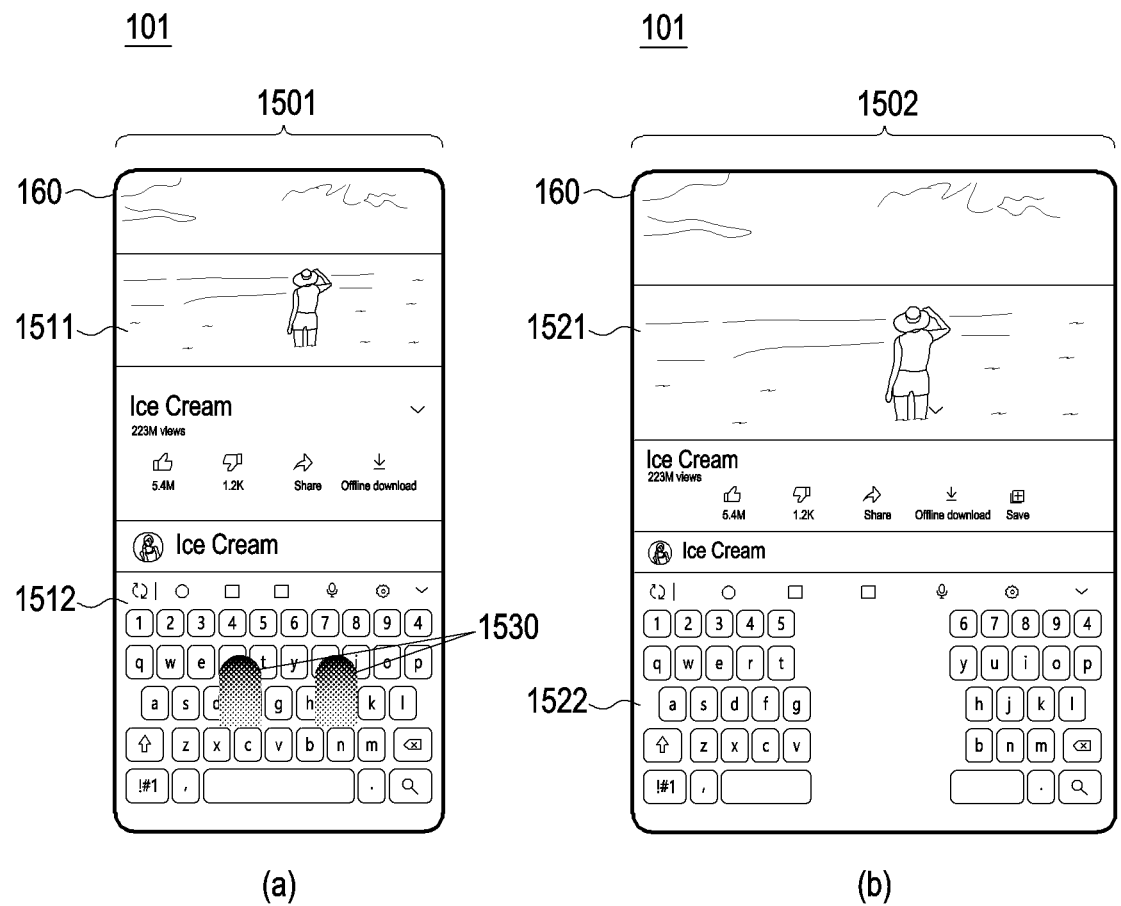
FIG. 15 illustrates an operation of an electronic device according to an embodiment of the disclosure.

FIG. 15 illustrates an operation of an electronic device according to an embodiment of the disclosure.

Figure 16:
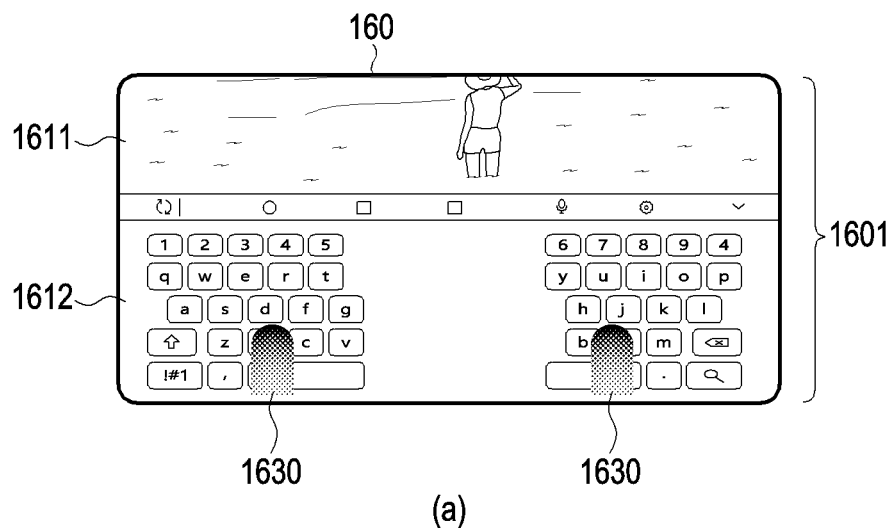
FIG. 16 illustrates an operation of an electronic device according to an embodiment of the disclosure.
Figure 16:
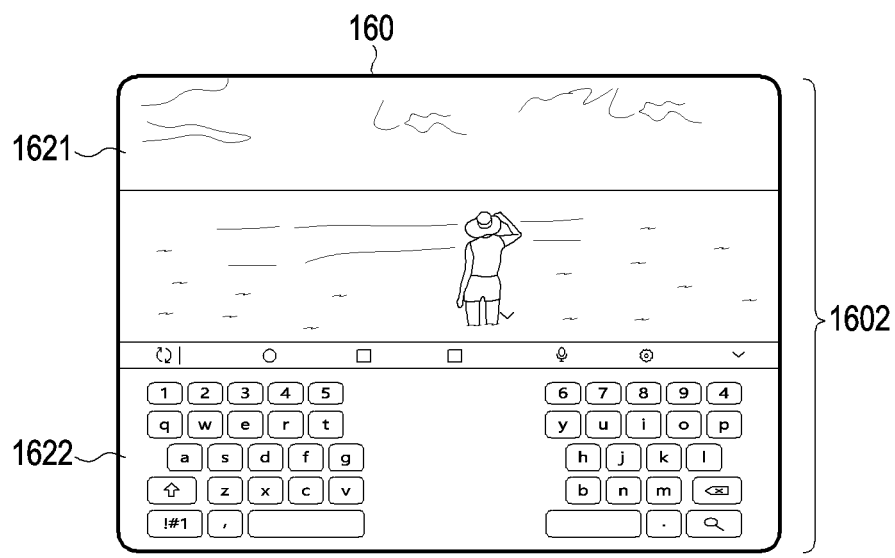

FIG. 16 illustrates an operation of an electronic device according to an embodiment of the disclosure.

FIG. 15 illustrates a state in which a screen of the display module 160 is displayed in a first direction (for example, a lengthwise direction or a vertical direction of the electronic device 101) while the electronic device 101 stands in the first direction (for example, the lengthwise direction or the vertical direction of the electronic device 101).

FIG. 16 illustrates a state in which a screen of the display module 160 is displayed in a second direction (for example, a widthwise direction or a horizontal direction of the electronic device 101) while the electronic device 101 stands in the second direction (for example, the widthwise direction or the horizontal direction of the electronic device 101).

FIGS. 15 and 16 illustrate an embodiment in which the electronic device 101 (for example, the display module 160) is expanded or reduced in the second direction (for example, the widthwise direction or the horizontal direction of the electronic device 101) as in FIG. 3. It can be understood by those skilled in the art that the embodiment described in FIGS. 4 to 13, 14A, and 14B is appliable to the electronic device 101 of FIGS. 15 and 16.

Referring to FIG. 15, an electronic device 101 (for example, the processor 120 of the electronic device 101) may display a first screen 1511 on the display module 160 and display a first object 1512 (for example, a virtual keyboard) in at least a partial area of the first screen 1511 in a reduced state 1501. For example, the electronic device 101 may detect a designated gesture input 1530 (for example, a double touch drag input) in an area in which the first object 1512 (for example, the virtual keyboard) is displayed. For example, the electronic device 101 may control, based on the detected gesture input 1530 (for example, the double touch drag input), expansion or reduction of the electronic device 101 (for example, the display module 160). For example, the electronic device 101 may, based on the detected gesture input 1530 (for example, the double touch drag input), change the state of the electronic device 101 (for example, the display module 160) to an expanded state 1502, display, on the expanded display module 160, a second screen 1521 obtained by expanding the first screen 1511, and display, in at least a partial area of the second screen 1521, a second object 1522 (for example, a virtual keyboard split in left and right) obtained by deforming the first object 1512 (for example, the virtual keyboard).

Referring to FIG. 16, an electronic device 101 (for example, the processor 120 of the electronic device 101) may display a third screen 1611 on the display module 160 and display a third object 1612 (for example, a virtual keyboard) in at least a partial area of the third screen 1611 in a reduced state 1601. For example, the electronic device 101 may detect a designated gesture input 1630 (for example, a double touch drag input) in an area in which the third object 1612 (for example, the virtual keyboard) is displayed. For example, the electronic device 101 may control, based on the detected gesture input 1630 (for example, the double touch drag input), expansion or reduction of the electronic device 101 (for example, the display module 160). For example, the electronic device 101 may change, based on the detected gesture input 1630 (for example, the double touch drag input), the state of the electronic device 11 (for example, the display module 160) to an expanded state 1602, display, on the expanded display module 160, a fourth screen 1621 obtained by expanding the third screen 1611, and display, in at least a partial area of the fourth screen 1621, a fourth object 1622 (for example, a virtual keyboard) corresponding to the third object 1612 (for example, the virtual keyboard). For example, referring to FIG. 16, the width of the area in which the third object 1612 (for example, the virtual keyboard) is displayed in part (a) of FIG. 16 may be identical to the width of the area in which the fourth object 1622 (for example, the virtual keyboard) is displayed in part (b) of FIG. 16, and as the state of the electronic device 101 (for example, the display module 160) is changed from the reduced state 1601 to the expanded state 1602, the electronic device 101 may display the fourth object 1622 (for example, the virtual keyboard) in the same form as that of the third object 1612 (for example, the virtual keyboard) having been displayed in the reduced state 1601.

Figure 17:
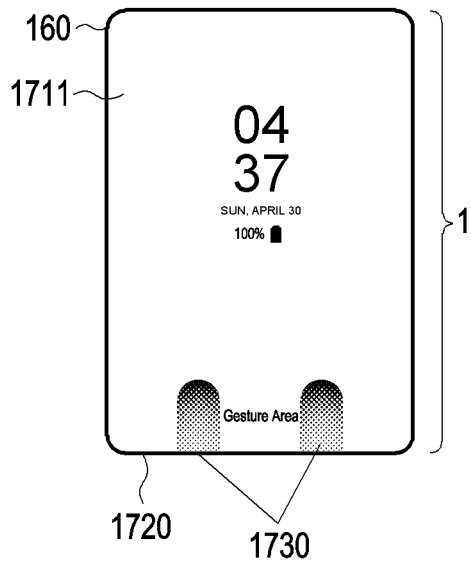
FIG. 17 illustrates an operation of an electronic device according to an embodiment of the disclosure.
Figure 17:
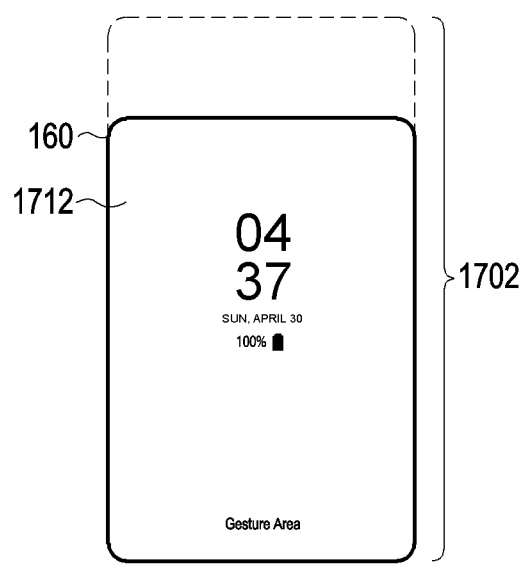

FIG. 17 illustrates an operation of an electronic device according to an embodiment of the disclosure.

Referring to FIG. 17, an electronic device 101 (for example, the processor 120 of the electronic device 101) may control expansion or reduction of the electronic device 101 (for example, the display module 160) as a designated gesture input 1730 (for example, a double touch drag input starting from the bottom 1720 of the display module 160 of the electronic device 101) is detected in a screen locked state. For example, the screen locked state may be a state in which an input except for a designated input (for example, an input of pressing a designated physical button or a designated touch gesture input) is ignored. For example, the electronic device 101 may perform a designated operation corresponding to the designated input if the designated input is detected in the screen locked state, but may not perform any operation for an input other than the designated input. For example, the electronic device 101 may not display a screen on the display module 160 in the screen locked state. For example, the electronic device 101 may display a designated screen 1711 on the display module 160 in the screen locked state. For example, the designated screen 1711 may be a screen including a clock object, a date object, a residual battery capacity, or a notification object. For example, referring to FIG. 17, the electronic device 101 may control the electronic device 101 to change the state of the electronic device 101 (for example, the display module 160) to an expanded state 1702 as the designated gesture input 1730 (for example, a double touch drag input starting from the bottom 1720 of the display module 160 of the electronic device 101) is detected in the screen locked state and a reduced state 1701.

Figure 18:
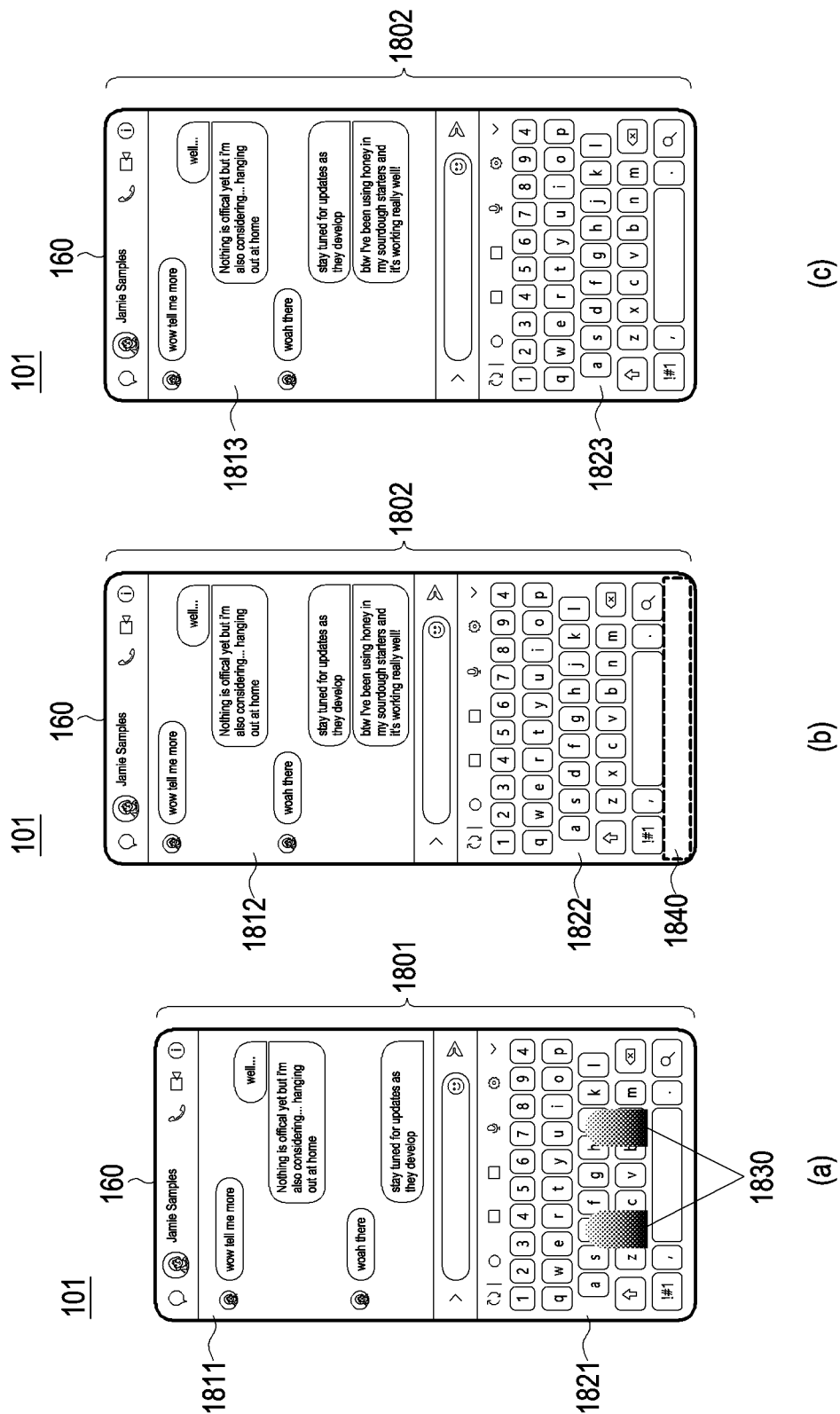
FIG. 18 illustrates an operation of an electronic device according to an embodiment of the disclosure.

FIG. 18 illustrates an operation of an electronic device according to an embodiment of the disclosure.

Referring to FIG. 18, an electronic device 101 (for example, the processor 120 of the electronic device 101) may display a first screen 1811 on the display module 160 and display a first object 1821 (for example, a virtual keyboard) in at least a partial area of the first screen 1811 in a reduced state 1801. For example, the electronic device 101 may control, based on detection of a designated gesture input 1830 in an area in which the first object 1821 (for example, the virtual keyboard) is displayed, expansion or reduction of the electronic device 101 (for example, the display module 160). For example, as the state of the electronic device 101 (for example, the display module 160) is changed from the reduced state 1801 to an expanded state 1802, the electronic device 101 may display a screen 1812 obtained by expanding the first screen 1811. For example, the electronic device 101 may additionally display at least a partial area of the first screen 1811, having been hidden by the first object 1821. For example, the electronic device 101 may change the location of the first object 1821 (for example, the virtual keyboard) to at least a partial area of the screen 1812 and display the same while displaying the screen 1812 obtained by expanding the first screen 1811. For example, referring to parts (a) and (b) of FIG. 18, as the electronic device 101 (for the display module 160) is expanded, the electronic device 101 may additionally display an additional area of the first screen 1811 while the first screen 1811 moves in an expansion direction of the screen, and may also display the first object 1821 by moving the object in an expansion direction of the screen. For example, referring to (b) of FIG. 18, as a first object 1822 is moved by a predetermined distance in the expansion direction of the screen, based on the expansion of the electronic device 101 (for example, the display module 160), the electronic device 101 may additionally display a screen 1840 having been hidden by the first object 1822 in the reduced state 1801. For example, referring to parts (b) and (c) of FIG. 18, as the electronic device 101 (for example, the display module 160) is expanded, the electronic device 101 may display the first object 1822 by moving the same by a predetermined distance in the expansion direction of the screen, so as to additionally display the screen 1840 having been hidden by the first object 1822 in the reduced state 1801. For example, the electronic device 101 may display a first object 1823 in an original location (for example, the location in which the first object 1823 has been displayed in the reduced state) while the electronic device 101 (for example, the display module 160) is in the expanded state 1802 and display the same while displaying a screen 1813 obtained by expanding the screen 1812.

Figure 19:
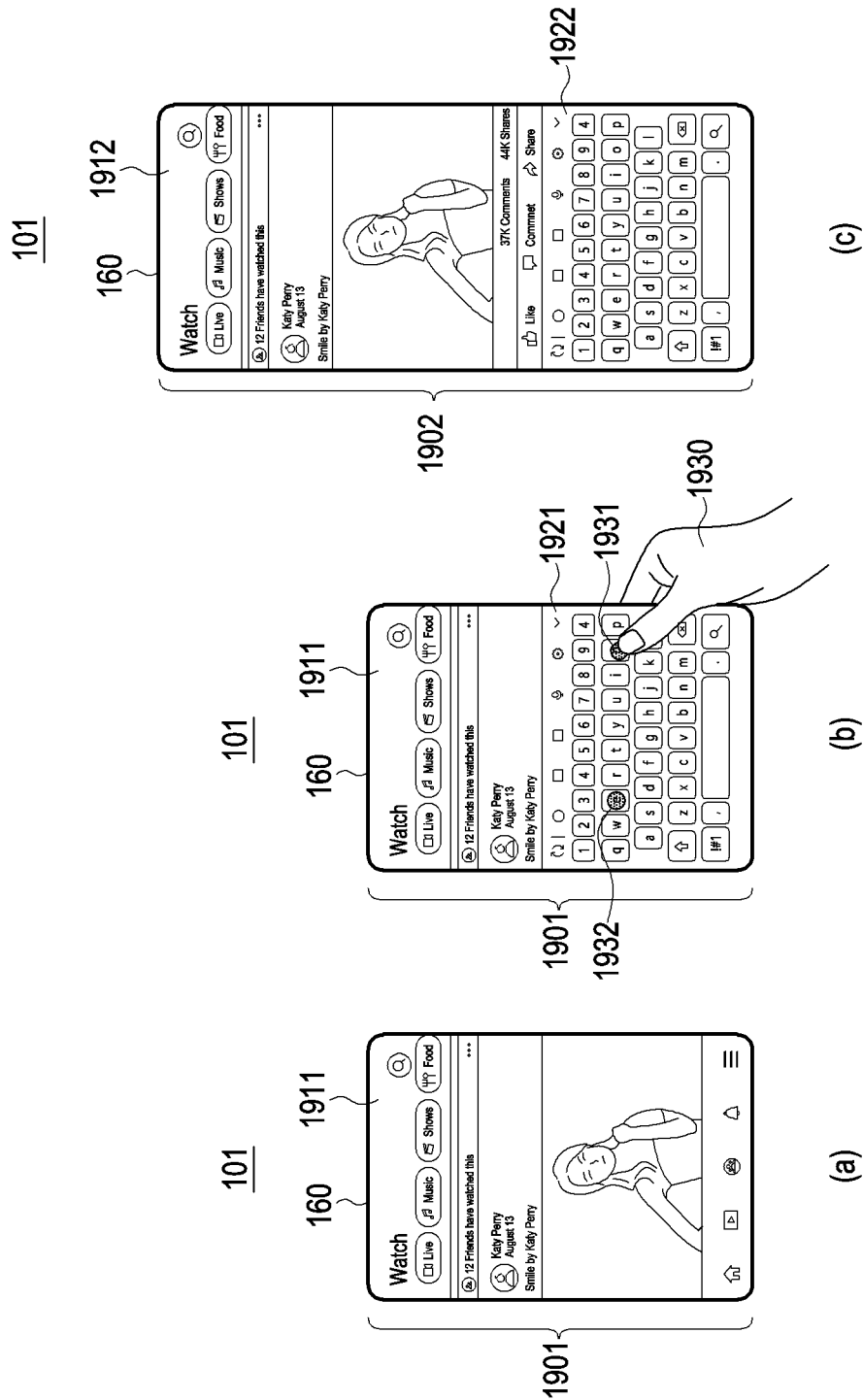
FIG. 19 illustrates an operation of an electronic device according to an embodiment of the disclosure.

FIG. 19 illustrates an operation of an electronic device according to an embodiment of the disclosure.

Referring to FIG. 19, an electronic device 101 (for example, the processor 120 of the electronic device 101) may display a first object 1921 (for example, a virtual keyboard) in at least a partial area on a first screen 1911 displayed on the display module 160 in a reduced state 1901. For example, the electronic device 101 may control, based on a touch input 1931 or 1932 (for example, a touch input by a user 1930 of inputting text by using a virtual keyboard) to an area in which the first object 1921 (for example, the virtual keyboard) is displayed in the reduced state 1901, the electronic device 101 to change the state of the electronic device 101 (for example, the display module 160) to an expanded state 1902. For example, the electronic device 101 may control, based on a touch input to at least one object among multiple objects (for example, objects indicating keys of a virtual keyboard) included in the second object 1921 (for example, the virtual keyboard), the electronic device 101 to additionally display text corresponding to the touch input on the screen 1912 and change the state of the electronic device 101 (for example, the display module 160) to the expanded state 1902 in which a first object 1922 (for example, the virtual keyboard) is displayed in the expanded state 1902.

Figure 20:
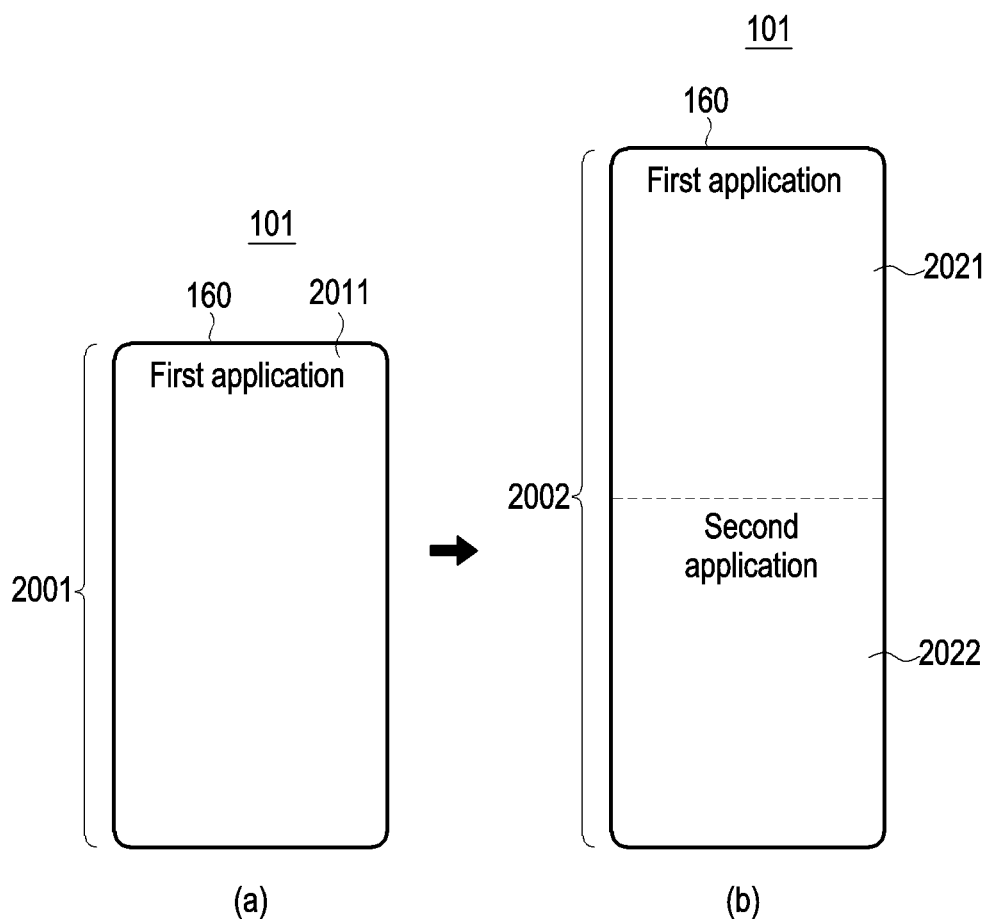
FIG. 20 illustrates an operation of an electronic device according to an embodiment of the disclosure.

FIG. 20 illustrates an operation of an electronic device according to an embodiment of the disclosure.

Referring to FIG. 20, an electronic device 101 (for example, the processor 120 of the electronic device 101) may display a first execution screen 2011 of a first application on the display module 160 in a reduced state 2001. For example, the electronic device 101 may control, based on a user input of requesting a split window operation in a reduced state 2001 and a state in which the first execution screen 2011 of the first application is displayed, the electronic device 101 to change the state of the electronic device 101 (for example, the display module 160) to an expanded state 2002. For example, the electronic device 101 may change, based on the user input of requesting the split window operation, the state of the electronic device 101 (for example, the display module 160) to the expanded state 2002, and may display a second execution screen 2021 of a first application in at least a partial area (for example, an upper part) of the expanded display module 160 and display a third execution screen 2022 of a second application in at least another partial area (for example, a lower area) of the expanded display module 160.

It can be understood by those who skilled in the art that various embodiments of the disclosure are cooperatively applicable to each other in an applicable range.

According to various embodiments of the disclosure, an electronic device (for example, the electronic device 101) may include a display (for example, the display module 160), and the processor 120, wherein the processor is configured to control the display to display a first screen in a first area (for example, the first area 201 of FIG. 2 or the first area 301 of FIG. 3) of the display during a first state in which a second area (for example, the second area 202 of FIG. 2 or the second area 302 of FIG. 3) among the first area and the second area of the display is not exposed to an outside of the electronic device, detect an event in a state in which the first screen is displayed in the first area, control, based on the detection of the event, the display to display a first object corresponding to the event in at least a partial area of the first area, the first object being displayed in at least a part of the first screen, identify a first gesture input of a user in an area in which the first object is displayed, in a state in which an area ratio of a size of the first object to a size of the first area is equal to or greater than a designated ratio, and control, in response to the identification of the first gesture input, the electronic device to change a state of the display from the first state to a second state in which the first area and the second area of the display are exposed to the outside of the electronic device.

According to various embodiments of the disclosure, the first object may be a pop-up window or a virtual keyboard displayed on the first screen.

According to various embodiments of the disclosure, the first gesture input may be a double touch drag input of moving in a first direction starting from a first point and a second point in the area in which the first object is displayed.

According to various embodiments of the disclosure, the processor may be configured to overlay a second layer including the first object onto a first layer including the first screen displayed in the first area so as to display the first object while the display is in the first state.

According to various embodiments of the disclosure, the processor may be configured to generate, on the second layer including the first object, a gesture layer covering an area corresponding to the at least a partial area in which the first object is displayed, and control, based on detection of the first gesture input on the gesture layer, the electronic device to change the display from the first state to the second state.

According to various embodiments of the disclosure, the processor may be configured to remove the gesture layer after changing the display to the second state in response to the first gesture input.

According to various embodiments of the disclosure, the processor may be configured to control the electronic device to change the display from the second state to the first state in response to a second gesture input of the user in the area in which the first object is displayed after changing the display to the second state.

According to various embodiments of the disclosure, the processor may be configured to control, based on displaying of a second object related to the first object after displaying the first object, the electronic device to change the display from the first state to the second state in response to the first gesture input of the user in an area in which the first object and the second object are displayed.

According to various embodiments of the disclosure, the processor may be configured to display the first object on the first screen while the display is in the first state, and display the first screen by moving, based on the display being changed to the second state, the first screen in a direction in which the display is expanded, so as to display, on the display, at least a partial area of the first screen, having been hidden by the first object in the first state.

According to various embodiments of the disclosure, the processor may be configured to control, in response to the first gesture input, the display to display the first object by moving the first object in a first direction.

According to various embodiments of the disclosure, an operation method of an electronic device 101 may include displaying a first screen in a first area (for example, the first area 201 of FIG. 2 or the first area 301 of FIG. 3) of a display (for example, the display module 160) of the electronic device during a first state in which a second area (for example, the second area 202 of FIG. 2 or the second area 302 of FIG. 3) among the first area and the second area of the display of the electronic device is not exposed to an outside of the electronic device, detecting an event in a state in which the first screen is displayed in the first area, displaying, based on the detection of the event, a first object corresponding to the event in at least a partial area of the first area, the first object being displayed in at least a part of the first screen, identify a first gesture input of a user in an area in which the first object is displayed, in a state in which an area ratio of a size of the first object to a size of the first area is equal to or greater than a designated ratio, and in response to the identification of the first gesture input, change a state of the display from the first state to a second state in which the first area and the second area of the display are exposed to the outside of the electronic device.

According to various embodiments of the disclosure, the first object may be a pop-up window or a virtual keyboard displayed on the first screen.

According to various embodiments of the disclosure, the first gesture input may be a double touch drag input of moving in a first direction starting from a first point and a second point in the area in which the first object is displayed.

According to various embodiments of the disclosure, the displaying of the first object may include overlaying a second layer including the first object onto a first layer including the first screen displayed in the first area so as to display the first object while the display is in the first state.

According to various embodiments of the disclosure, the method may further include generate, on the second layer including the first object, a gesture layer covering an area corresponding to the at least a partial area in which the first object is displayed, wherein the changing of the display from the first state to the second state may include change, based on detection of the first gesture input on the gesture layer, the display from the first state to the second state.

According to various embodiments of the disclosure, the method may further include removing the gesture layer after changing the display to the second state in response to the first gesture input.

According to various embodiments of the disclosure, the method may further include changing the display from the second state to the first state in response to a second gesture input of the user in the area in which the first object is displayed after changing the display to the second state.

According to various embodiments of the disclosure, the changing of the display from the first state to the second state may include changing, based on displaying of a second object related to the first object after displaying the first object, the display from the first state to the second state in response to the first gesture input of the user in an area in which the first object and the second object are displayed.

According to various embodiments of the disclosure, the method may further include displaying the first screen by moving, based on the display being changed to the second state, the first screen in a direction in which the display is expanded, so as to display, on the display, at least a partial area of the first screen, having been hidden by the first object in the first state.

According to various embodiments of the disclosure, the method may further include in response to the first gesture input, displaying the first object by moving the first object in a first direction.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display including a first area and a second area, wherein the first area is exposed to outside of the electronic device in a first state and a second state of the electronic device, and the second area is not exposed to the outside of the electronic device in the first state of the electronic device and is exposed to the outside of the electronic device in the second state of the electronic device;
    memory storing one or more computer programs; and
    one or more processors communicatively coupled to the display and the memory,
    wherein the one or more computer programs include computer-executable instructions that, when executed by the one or more processors individually or collectively, cause the electronic device to:
        control the display to display a first screen in the first area of the display in the first state of the electronic device,
        while the first screen is displayed in the first area, detect an event causing a first object to be displayed,
        control, based on detection of the event, the display to display the first object corresponding to the event in a partial area of the first area, the first object being displayed on at least a part of the first screen in the first area,
        identify a first gesture input of a user in an area in which the first object is displayed,
        based on identifying an area ratio of a size of the first object to a size of the first area being equal to or greater than a designated ratio and identifying the first gesture input, control the electronic device to change a state of the electronic device from the first state to the second state, and
        based on identifying the area ratio being less than the designated ratio and identifying the first gesture input, control the electronic device to maintain the state of the electronic device in the first state.

2. The electronic device of claim 1, wherein the first object is a pop-up window or a virtual keyboard displayed on the first screen.

3. The electronic device of claim 1, wherein the first gesture input is a double touch drag input of moving in a first direction starting from a first point and a second point in the area in which the first object is displayed.

4. The electronic device of claim 1, wherein the one or more computer programs further include computer-executable instructions that, when executed by the one or more processors individually or collectively, cause the electronic device to overlay a second layer comprising the first object onto a first layer comprising the first screen displayed in the first area so as to display the first object while in the first state.

5. The electronic device of claim 4, wherein the one or more computer programs further include computer-executable instructions that, when executed by the one or more processors individually or collectively, cause the electronic device to:
    generate, on the second layer comprising the first object, a gesture layer covering an area corresponding to the partial area in which the first object is displayed; and
    control, based on detection of the first gesture input on the gesture layer, the electronic device to change the state of the electronic device from the first state to the second state.

6. The electronic device of claim 5, wherein the one or more computer programs further include computer-executable instructions that, when executed by the one or more processors individually or collectively, cause the electronic device to remove the gesture layer after changing to the second state in response to the first gesture input.

7. The electronic device of claim 1, wherein the one or more computer programs further include computer-executable instructions that, when executed by the one or more processors individually or collectively, cause the electronic device to control the electronic device to change the state of the electronic device from the second state to the first state in response to a second gesture input of the user in the area in which the first object is displayed after changing the state of the electronic device to the second state.

8. The electronic device of claim 1, wherein the one or more computer programs further include computer-executable instructions that, when executed by the one or more processors individually or collectively, cause the electronic device to, based on displaying of a second object related to the first object after displaying the first object, control the electronic device to change the state of the electronic device from the first state to the second state in response to the first gesture input of the user in an area in which the first object and the second object are displayed.

9. The electronic device of claim 1, wherein the one or more computer programs further include computer-executable instructions that, when executed by the one or more processors individually or collectively, cause the electronic device to:
    display the first object on the first screen while in the first state; and
    display the first screen by moving, based on the change to the second state, the first screen in a first direction, so as to display, on the display, a partial area of the first screen, having been hidden by the first object in the first state.

10. The electronic device of claim 1, wherein the one or more computer programs further include computer-executable instructions that, when executed by the one or more processors individually or collectively, cause the electronic device to, in response to the first gesture input, control the display to display the first object by moving the first object in a first direction.

11. The electronic device of claim 1, wherein the first gesture input includes at least one of a long press, a three-finger swipe, or a force touch.

12. A method of operating an electronic device, the method comprising:
 displaying a first screen in a first area of a display during a first state of the electronic device in which a second area among the first area and the second area of the display of the electronic device is not exposed to an outside of the electronic device;
 while the first screen is displayed in the first area, detecting an event causing a first object to be displayed;
 displaying, based on detection of the event, the first object corresponding to the event in a partial area of the first area, the first object being displayed on at least a part of the first screen in the first area;
 identifying a first gesture input of a user in an area in which the first object is displayed;
 based on identifying an area ratio of a size of the first object to a size of the first area being equal to or greater than a designated ratio and identifying the first gesture input, changing a state of the electronic device from the first state to a second state in which the first area and the second area of the display are exposed to the outside of the electronic device; and
 based on identifying the area ratio being less than the designated ratio and identifying the first gesture input, maintaining the state of the electronic device in the first state.

13. The method of claim 12, wherein the first gesture input is a double touch drag input of moving in a first direction starting from a first point and a second point in the area in which the first object is displayed.

14. The method of claim 12, wherein the displaying of the first object comprises overlaying a second layer comprising the first object onto a first layer comprising the first screen displayed in the first area so as to display the first object while the display is in the first state.

15. The method of claim 14, further comprising:
 generating, on the second layer comprising the first object, a gesture layer covering an area corresponding to the partial area in which the first object is displayed,
 wherein the changing the state of the electronic device from the first state to the second state comprises changing from the first state to the second state based on detection of the first gesture input on the gesture layer.

16. The method of claim 15, further comprising:
 removing the gesture layer after changing the state of the electronic device to the second state in response to the first gesture input.

17. The method of claim 12, further comprising:
 changing the state of the electronic device from the second state to the first state in response to a second gesture input of the user in the area in which the first object is displayed after changing the state of the electronic device to the second state.

18. The method of claim 12, further comprising:
 based on displaying of a second object related to the first object after displaying the first object, controlling the electronic device to change the state of the electronic device from the first state to the second state in response to the first gesture input of the user in an area in which the first object and the second object are displayed.

19. One or more non-transitory computer-readable storage media storing computer-executable instructions that, when executed by one or more processors individually or collectively, cause an electronic device to perform operations, the operations comprising:
 displaying a first screen in a first area of a display during a first state of the electronic device in which a second area among the first area and the second area of the display of the electronic device is not exposed to an outside of the electronic device;
 while the first screen is displayed in the first area, detecting an event causing a first object to be displayed;
 displaying, based on detection of the event, the first object corresponding to the event in a partial area of the first area, the first object being displayed on at least a part of the first screen in the first area;
 identifying a first gesture input of a user in an area in which the first object is displayed;
 based on identifying an area ratio of a size of the first object to a size of the first area being equal to or greater than a designated ratio and identifying the first gesture input, changing a state of the electronic device from the first state to a second state in which the first area and the second area of the display are exposed to the outside of the electronic device; and
 based on identifying the area ratio being less than the designated ratio and identifying the first gesture input, maintaining the state of the electronic device in the first state.

\* \* \* \* \*